United States Patent
Jo et al.

(10) Patent No.: US 11,862,100 B2
(45) Date of Patent: Jan. 2, 2024

(54) DISPLAY DEVICE

(71) Applicant: SAMSUNG DISPLAY CO., LTD., Yongin-si (KR)

(72) Inventors: Kangbin Jo, Suwon-si (KR); Ilnam Kim, Hwaseong-si (KR); Seunghyun Moon, Suwon-si (KR); Dongwook Yang, Suwon-si (KR); Hyundae Lee, Hwaseong-si (KR); Goeun Cha, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/731,886

(22) Filed: Apr. 28, 2022

(65) Prior Publication Data

US 2023/0069681 A1 Mar. 2, 2023

(30) Foreign Application Priority Data

Aug. 31, 2021 (KR) .................. 10-2021-0115486

(51) Int. Cl.
| | |
|---|---|
| *G09G 3/3266* | (2016.01) |
| *G09G 3/3233* | (2016.01) |
| *G06V 40/13* | (2022.01) |
| *G06F 3/041* | (2006.01) |

(52) U.S. Cl.
CPC ......... *G09G 3/3266* (2013.01); *G06F 3/0412* (2013.01); *G06V 40/1318* (2022.01); *G09G 3/3233* (2013.01); *G09G 2300/0426* (2013.01)

(58) Field of Classification Search
CPC .. G09G 3/3233; G09G 3/3258; G09G 3/3266; G06F 3/0412; G06F 2300/0439; G06F 2300/0426; G06F 2310/061; H01L 27/288; H01L 27/14609; H01L 27/14643
USPC ..................................... 345/76, 78; 358/448
See application file for complete search history.

(56) References Cited

U.S. PATENT DOCUMENTS

| | | | |
|---|---|---|---|
| 11,158,258 B2 | 10/2021 | Cha et al. | |
| 2003/0020969 A1* | 1/2003 | Kimura ................. | H04N 25/58 |
| | | | 358/448 |
| 2016/0104423 A1* | 4/2016 | Park .................... | G09G 3/3233 |
| | | | 345/78 |
| 2016/0321987 A1* | 11/2016 | Oh ........................ | G06F 3/0412 |
| 2018/0174514 A1* | 6/2018 | Lee ..................... | G09G 3/3233 |
| 2019/0355302 A1* | 11/2019 | Ding ................... | G09G 3/3275 |
| 2020/0393949 A1* | 12/2020 | Kim ..................... | G06F 3/0446 |
| 2022/0293055 A1* | 9/2022 | Hatano ............... | G09G 3/3233 |
| 2022/0351538 A1* | 11/2022 | Tago .................. | G06V 40/1318 |

FOREIGN PATENT DOCUMENTS

| | | |
|---|---|---|
| KR | 10-2019-0081730 | 7/2019 |
| KR | 10-2021-0064483 | 6/2021 |

* cited by examiner

*Primary Examiner* — Prabodh M Dharia
(74) *Attorney, Agent, or Firm* — F. Chau & Associates, LLC

(57) ABSTRACT

A display device includes a display panel and a scan driving circuit. The display panel includes a plurality of pixels and a plurality of sensors. The scan driving circuit drives a plurality of scan lines. Pixels in a j-th row among the plurality of pixels are connected to a j-th scan line among the plurality of scan lines, in which j is a positive integer. Sensors, which correspond to the pixels in the j-th row, from among the plurality of sensors are connected to an a-th scan line among the plurality of scan lines, in which a is a positive integer different from j.

20 Claims, 22 Drawing Sheets

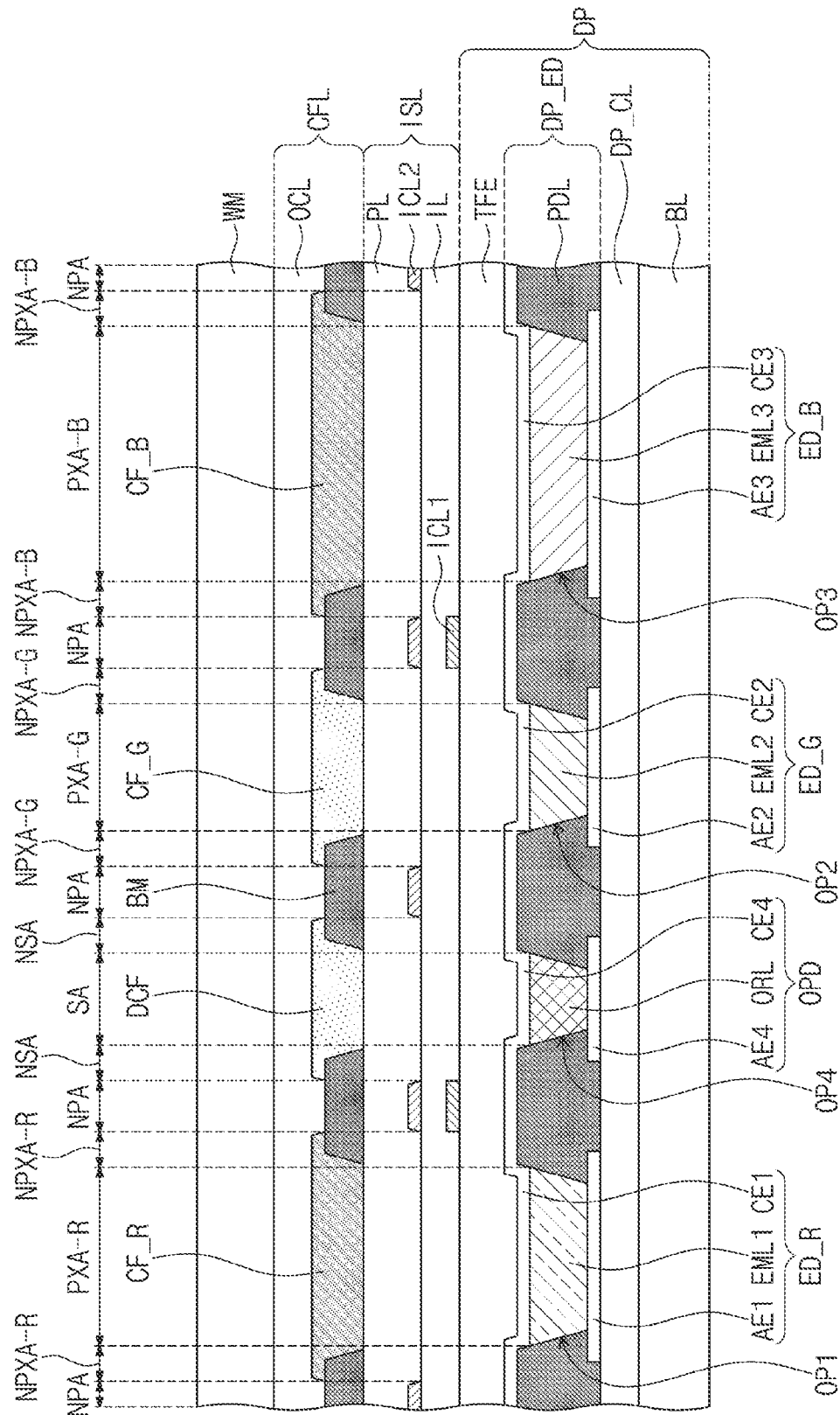

DISPLAY DEVICE

CROSS-REFERENCE TO RELATED APPLICATIONS

This application claims priority under 35 U.S.C. § 119 to Korean Patent Application No. 10-2021-0115486 filed on Aug. 31, 2021, the disclosure of which is hereby incorporated by reference in its entirety.

TECHNICAL FIELD

Embodiments of the present disclosure described herein relate to a display device, and more particularly, to a display device capable of detecting biometric information.

DISCUSSION OF RELATED ART

Multimedia electronic devices such as, for example, a TV, a mobile phone, a tablet personal computer (PC), a navigation system, a game console, etc., include a display device that displays an image. In addition to a general input method such as, for example, a button, a keyboard, a mouse, etc., an electronic device may include a display device capable of providing a touch-based input method that allows a user to enter information or commands easily and intuitively.

A method using biometric information such as, for example, a fingerprint, has been proposed as a user authentication means for providing security for sensitive matters including, for example, online banking, online shopping, etc.

SUMMARY

Embodiments of the present disclosure provide a display device capable of detecting biometric information.

According to an embodiment, a display device includes a display panel including a plurality of pixels and a plurality of sensors and a scan driving circuit that drives a plurality of scan lines. Pixels in a j-th ('j' is a positive integer) row among the plurality of pixels are connected to a j-th scan line among the plurality of scan lines. Sensors, which correspond to the pixels in the j-th row, from among the plurality of sensors are connected to an a-th (a' is a positive integer other than 'j') scan line among the plurality of scan lines.

In an embodiment, sensors, which correspond to pixels in a (j+1)-th row, from among the plurality of sensors may be connected to a b-th ('b' is a positive integer other than 'a' and 'j+1') scan line among the plurality of scan lines.

In an embodiment, 'b' may have a value different from 'a'.

In an embodiment, a first display area and a second display area may be defined in the display panel. The plurality of pixels may be arranged in the first display area and the second display area. The plurality of sensors may be arranged in the second display area.

In an embodiment, each of the plurality of sensors may include a light sensing element and a sensor driving circuit connected to the light sensing element and a corresponding scan line among the plurality of scan lines and outputting a detection signal corresponding to external light in response to a scan signal received through the corresponding scan line.

In an embodiment, the sensor driving circuit may include a reset transistor including a first electrode that receives a reset voltage, a second electrode connected to a first sensing node, and a gate electrode that receives a reset signal, an amplification transistor including a first electrode that receives a driving voltage, a second electrode connected to a second sensing node, and a gate electrode connected to the first sensing node, and an output transistor including a first electrode connected to the second sensing node, a second electrode connected to a readout line, and a gate electrode that receives the scan signal.

In an embodiment, the reset transistor may be a transistor having a type different from a type of each of the amplification transistor and the output transistor.

In an embodiment, the reset transistor may be an N-type transistor. Each of the amplification transistor and the output transistor may be a P-type transistor.

In an embodiment, the display device may further include a readout circuit connected to the readout line and receiving the detection signal through the readout line in response to at least one switching signal.

In an embodiment, each of the plurality of pixels may include a light emitting element and a pixel driving circuit connected to the light emitting element and a corresponding scan line among the plurality of scan lines and driving the light emitting element in response to a scan signal received through the corresponding scan line.

In an embodiment, the pixel driving circuit may include a first transistor connected between a first driving voltage line receiving a first driving voltage and the light emitting element, a second transistor connected between a data line and a first electrode of the first transistor and including a gate electrode connected to the corresponding scan line among the plurality of scan lines, and a third transistor connected between a second electrode of the first transistor and a gate electrode of the first transistor and including a gate electrode receiving a first scan signal.

In an embodiment, each of the first transistor and the second transistor may be a P-type transistor, and the third transistor may be an N-type transistor.

In an embodiment, the pixel driving circuit may further include a fourth transistor connected between the gate electrode of the first transistor and a second driving voltage line and including a gate electrode receiving a second scan signal, a fifth transistor connected between the first driving voltage line and the first electrode of the first transistor and including a gate electrode receiving a emission control signal, a sixth transistor connected between the second electrode of the first transistor and the light emitting element and including a gate electrode receiving the emission control signal, and a seventh transistor connected between the light emitting element and a third driving voltage line and including a gate electrode connected to the corresponding scan line among the plurality of scan lines.

In an embodiment, the display panel may include a base layer, a circuit layer, which is disposed on the base layer and in which the pixel driving circuit and the sensor driving circuit are disposed, and an element layer, which is disposed on the circuit layer and in which the light emitting element and the light sensing element are disposed.

In an embodiment, the light emitting element may be an organic light emitting diode. The light sensing element may be an organic photodiode.

According to an embodiment, a display device includes a plurality of pixels, each of which includes a light emitting element and a pixel driving circuit connected to the light emitting element and driving the light emitting element and a plurality of sensors, each of which includes a light sensing element and a sensor driving circuit connected to the light sensing element and outputting a detection signal corresponding to external light. Pixels in a j-th ('j' is a positive integer) row among the plurality of pixels are connected to a j-th scan line among the plurality of scan lines. The sensor driving circuit of a sensor, which corresponds to the pixels in the j-th row, from among the plurality of sensors includes a reset transistor including a first electrode that receives a reset voltage, a second electrode connected to a first sensing node, and a gate electrode that receives a reset signal, an amplification transistor including a first electrode that receives a driving voltage, a second electrode connected to a second sensing node, and a gate electrode connected to the first sensing node, and an output transistor including a first electrode connected to the second sensing node, a second electrode connected to a readout line, and a gate electrode connected to an a-th ('a' is a positive integer other than 'j') scan line among the plurality of scan lines.

In an embodiment, a first display area and a second display area may be defined in the display panel. The plurality of pixels may be arranged in the first display area and the second display area. The plurality of sensors may be arranged in the second display area.

In an embodiment, the display device may further include a readout circuit connected to the readout line and receiving the detection signal through the readout line in response to at least one switching signal.

In an embodiment, the pixel driving circuit may include a first transistor connected between a first driving voltage line receiving a first driving voltage and the light emitting element, a second transistor connected between a data line and a first electrode of the first transistor and including a gate electrode connected to the corresponding scan line among the plurality of scan lines, and a third transistor connected between a second electrode of the first transistor and a gate electrode of the first transistor and including a gate electrode receiving a first scan signal.

In an embodiment, each of the amplification transistor, the output transistor, the first transistor, and the second transistor may be a P-type transistor. Each of the reset transistor and the third transistor may be an N-type transistor.

BRIEF DESCRIPTION OF THE DRAWINGS

The above and other objects and features of the present disclosure will become more apparent by describing in detail embodiments thereof with reference to the accompanying drawings, in which:

FIGS. 15A and 15B are cross-sectional views illustrating a light emitting element and a light sensing element of a display panel, according to an embodiment of the present disclosure.

DETAILED DESCRIPTION

Figure 1:
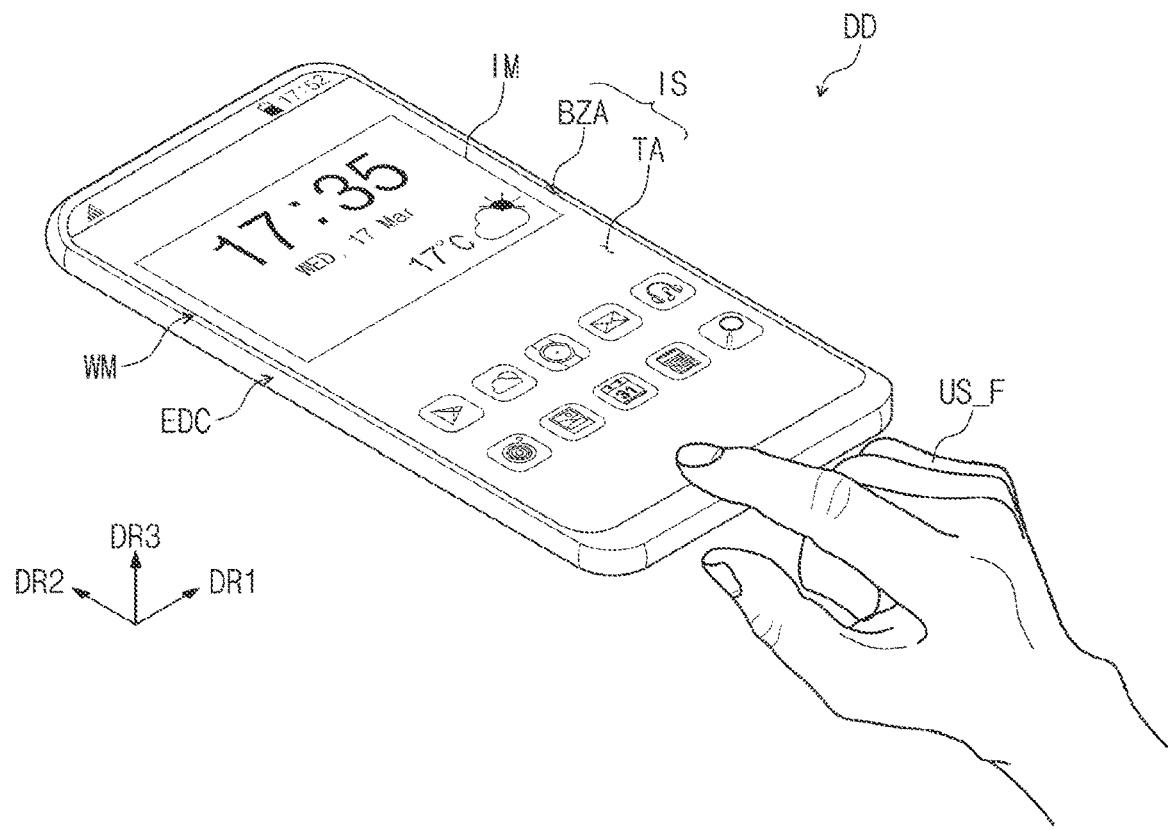
FIG. 1 is a perspective view of a display device, according to an embodiment of the present disclosure.

Embodiments of the present disclosure will be described more fully hereinafter with reference to the accompanying drawings. Like reference numerals may refer to like elements throughout the accompanying drawings.

It will be understood that when a component such as a film, a region, a layer, or an element, is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. It will also be understood that when a component is referred to as "covering" another component, it can be the only component covering the other component, or one or more intervening components may also be covering the other component. Other words used to describe the relationships between components should be interpreted in a like fashion.

The term "and/or" includes one or more combinations of the associated listed items.

The terms "first", "second", etc. are used to describe various components, but the components are not limited by the terms. The terms are used only to differentiate one component from another component. For example, without departing from the scope and spirit of the present disclosure, a first component may be referred to as a second component, and similarly, the second component may be referred to as the first component.

As used herein, the singular forms "a", "an" and "the" are intended to include the plural forms as well, unless the context clearly indicates otherwise.

Spatially relative terms, such as "beneath", "below", "lower", "under", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Figure 2:
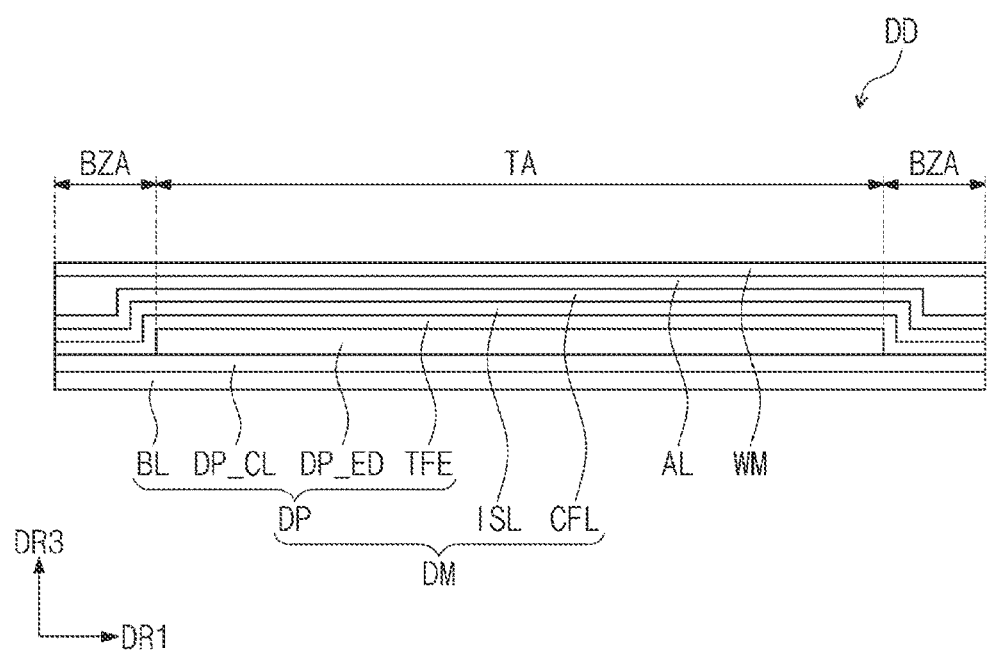
FIG. 2 is a cross-sectional view of a display device, according to an embodiment of the present disclosure.

FIG. 1 is a perspective view of a display device, according to an embodiment of the present disclosure. FIG. 2 is a cross-sectional view of a display device, according to an embodiment of the present disclosure.

Referring to FIGS. 1 and 2, a display device DD may have a shape of a rectangle having a short side parallel to a first direction DR1 and a long side parallel to a second direction DR2 intersecting the first direction DR1. However, embodiments of the present disclosure are not limited thereto, and the display device DD may have various shapes such as, for example, a circle and a polygon.

The display device DD may be a device that is activated depending on an electrical signal. The display device DD may include various embodiments. For example, the display device DD may be applied to an electronic device such as a smartwatch, a tablet PC, a notebook computer, a computer, a smart television, etc.

Hereinafter, a normal direction substantially perpendicular to a plane defined by the first direction DR1 and the second direction DR2 is defined as a third direction DR3. In the specification, the meaning of "when viewed from above a plane" may mean "when viewed in the third direction DR3".

A top surface of the display device DD may be defined as a display surface IS, and may have a plane defined by the first direction DR1 and the second direction DR2. Images IM generated by the display device DD may be provided to a user through the display surface IS.

The display surface IS may be divided into a transparent area TA and a bezel area BZA. The transparent area TA may be an area in which the images IM are displayed. A user visually perceives the images IM through the transparent area TA. In an embodiment, the transparent area TA is illustrated in a shape of a quadrangle whose vertexes are rounded. However, this is illustrated only as an example. For example, according to embodiments, the transparent area TA may have various shapes.

The bezel area BZA is adjacent to the transparent area TA. The bezel area BZA may have a predetermined color. The bezel area BZA may surround the transparent area TA. Accordingly, the shape of the transparent area TA may be substantially defined by the bezel area BZA. However, this is illustrated by way of example. For example, according to embodiments, the bezel area BZA may be disposed adjacent to only one side of the transparent area TA or may be omitted.

The display device DD may detect an external input applied from outside of the display device DD. The external input may include various inputs applied from outside of the display device DD. For example, as well as a contact by a part of a body such as the user's hand (including a user's finger) US_F, the external input may include an external input (e.g., hovering) applied when the user's hand US_F approaches the display device DD or is adjacent to the display device DD within a predetermined distance (e.g., without physically contacting the display device DD). In addition, the external input may have various forms such as, for example, force, pressure, temperature, light, etc.

The display device DD may detect the user's biometric information applied from outside of the display device DD. A biometric information sensing area capable of detecting the user's biometric information may be provided on the display surface IS of the display device DD. The biometric information sensing area may be provided in the entire area of the transparent area TA or may be provided in a partial area of the transparent area TA.

The display device DD may include a window WM, a display module DM, and housing EDC. In an embodiment, an appearance of the display device DD may be implemented by coupling the window WM and the housing EDC.

A front surface of the window WM defines the display surface IS of the display device DD. The window WM may include an optically transparent material. For example, the window WM may include glass or plastic. The window WM may include a multi-layer structure or a single-layer structure. For example, the window WM may include a plurality of plastic films bonded to each other by an adhesive or may have a glass substrate and a plastic film bonded to each other by an adhesive.

The display module DM includes a display panel DP and an input sensing layer ISL. The display panel DP may display an image depending on an electrical signal. The input sensing layer ISL may sense an external input applied from outside of the display module DM. The external input may be provided in various forms.

The display panel DP according to an embodiment of the present disclosure may be a light emitting display panel, but is not particularly limited thereto. For example, the display panel DP may be an organic light emitting display panel, an inorganic light emitting display panel, or a quantum dot light emitting display panel. A light emitting layer of the organic light emitting display panel may include an organic light emitting material. A light emitting layer of the inorganic light emitting display panel may include an inorganic light emitting material. An emission layer of the quantum dot light emitting display panel may include a quantum dot, a quantum rod, etc. Hereinafter, it is described that the display panel DP is an organic light emitting display panel.

Referring to FIG. 2, the display panel DP includes a base layer BL, a circuit layer DP_CL, an element layer DP_ED, and an encapsulation layer TFE. The display panel DP according to an embodiment of the present disclosure may be a flexible display panel. However, the present disclosure is not limited thereto. For example, the display panel DP may be a foldable display panel, which is folded with respect to a folding axis, or a rigid display panel.

The base layer BL may include a synthetic resin layer. The synthetic resin layer may be a polyimide-based resin layer. However, the material thereof is not particularly limited. For example, according to embodiments, the base layer BL may include a glass substrate, a metal substrate, an organic/inorganic composite substrate, etc.

The circuit layer DP_CL is disposed on the base layer BL. The circuit layer DP_CL includes at least one insulating layer and a circuit element. Hereinafter, the insulating layer included in the circuit layer DP_CL is referred to as an "intermediate insulating layer". The intermediate insulating layer includes at least one intermediate inorganic film and at least one intermediate organic film. The circuit element may include a pixel driving circuit, which is included in each of the plurality of pixels and is used to display an image, and a sensor driving circuit, which is included in each of the plurality of sensors and is used to recognized external information. The external information may be biometric information. In an embodiment of the present disclosure, the sensor may be a fingerprint recognition sensor, a proximity sensor, an iris recognition sensor, etc. Furthermore, the sensor may be an optical sensor that recognizes the biometric information in an optical scheme. The circuit layer DP_CL may further include signal lines connected to the pixel driving circuit and the sensor driving circuit.

The element layer DP_ED may include a light emitting element included in each of the pixels and a light sensing element included in each of the sensors. In an embodiment of the present disclosure, the light sensing element may be a photodiode. An optical fingerprint sensor may detect light reflected by a user's fingerprint. The circuit layer DP_CL and the element layer DP_ED will be described in further detail below with reference to FIGS. 12, 13A, and 13B.

The encapsulation layer TFE encapsulates the element layer DP_ED. The encapsulation layer TFE may include at least one organic film and at least one inorganic film. The inorganic film may include inorganic materials and may protect the element layer DP_ED from moisture/oxygen. The inorganic film may include, for example, a silicon nitride layer, a silicon oxynitride layer, a silicon oxide layer, a titanium oxide layer, an aluminum oxide layer, etc. However, the inorganic film is not limited thereto. The organic film may include organic materials and may protect the element layer DP_ED from foreign objects such as dust particles.

The input sensing layer ISL may be formed on the display panel DP. The input sensing layer ISL may be disposed directly on the encapsulation layer TFE. According to an embodiment of the present disclosure, the input sensing layer ISL may be formed on the display panel DP through a subsequent process. For example, in an embodiment, when the input sensing layer ISL is directly disposed on the display panel DP, an adhesive film is not interposed between the input sensing layer ISL and the encapsulation layer TFE. However, alternatively, in an embodiment, an inner adhesive film may be interposed between the input sensing layer ISL and the display panel DP. In this case, the input sensing layer ISL is not manufactured by a process continuous to that of the display panel DP. That is, the input sensing layer ISL may be manufactured through a process separate from that of the manufacturing process of the display panel DP and may then be fixed on an upper surface of the display panel DP by the inner adhesive film.

The input sensing layer ISL may sense an external input (e.g., a user's touch), may change the sensed input into a predetermined input signal, and may provide the input signal to the display panel DP. The input sensing layer ISL may include a plurality of sensing electrodes that sense an external input. The sensing electrodes may sense the external input in a capacitive scheme. The display panel DP may receive an input signal from the input sensing layer ISL and may generate an image corresponding to the input signal.

The display module DM may further include a color filter layer CFL. In an embodiment of the present disclosure, the color filter layer CFL may be disposed on the input sensing layer ISL. However, the present disclosure is not limited thereto. For example, according to embodiments, the color filter layer CFL may be interposed between the display panel DP and the input sensing layer ISL. The color filter layer CFL may include a plurality of color filters and a black matrix.

Details of the structure of the input sensing layer ISL and the color filter layer CFL will be described in further detail below.

The display device DD according to an embodiment of the present disclosure may further include an adhesive layer AL. The window WM may be attached to the input sensing layer ISL by the adhesive layer AL. The adhesive layer AL may include, for example, an optical clear adhesive, an optically clear adhesive resin, or a pressure sensitive adhesive (PSA).

The housing EDC is coupled to the window WM. The housing EDC is coupled to the window WM so as to provide predetermined inner space. The display module DM may be accommodated in the inner space. The housing EDC may include a material having relatively high rigidity. For example, the housing EDC may include glass, plastic, or metal or may include a plurality of frames and/or plates that are composed of a combination thereof. The housing EDC may stably protect configurations of the display device DD accommodated in the inner space from an external impact. In an embodiment, a battery module for supplying power utilized for overall operations of the display device DD may be interposed between the display module DM and the housing EDC.

Figure 3:
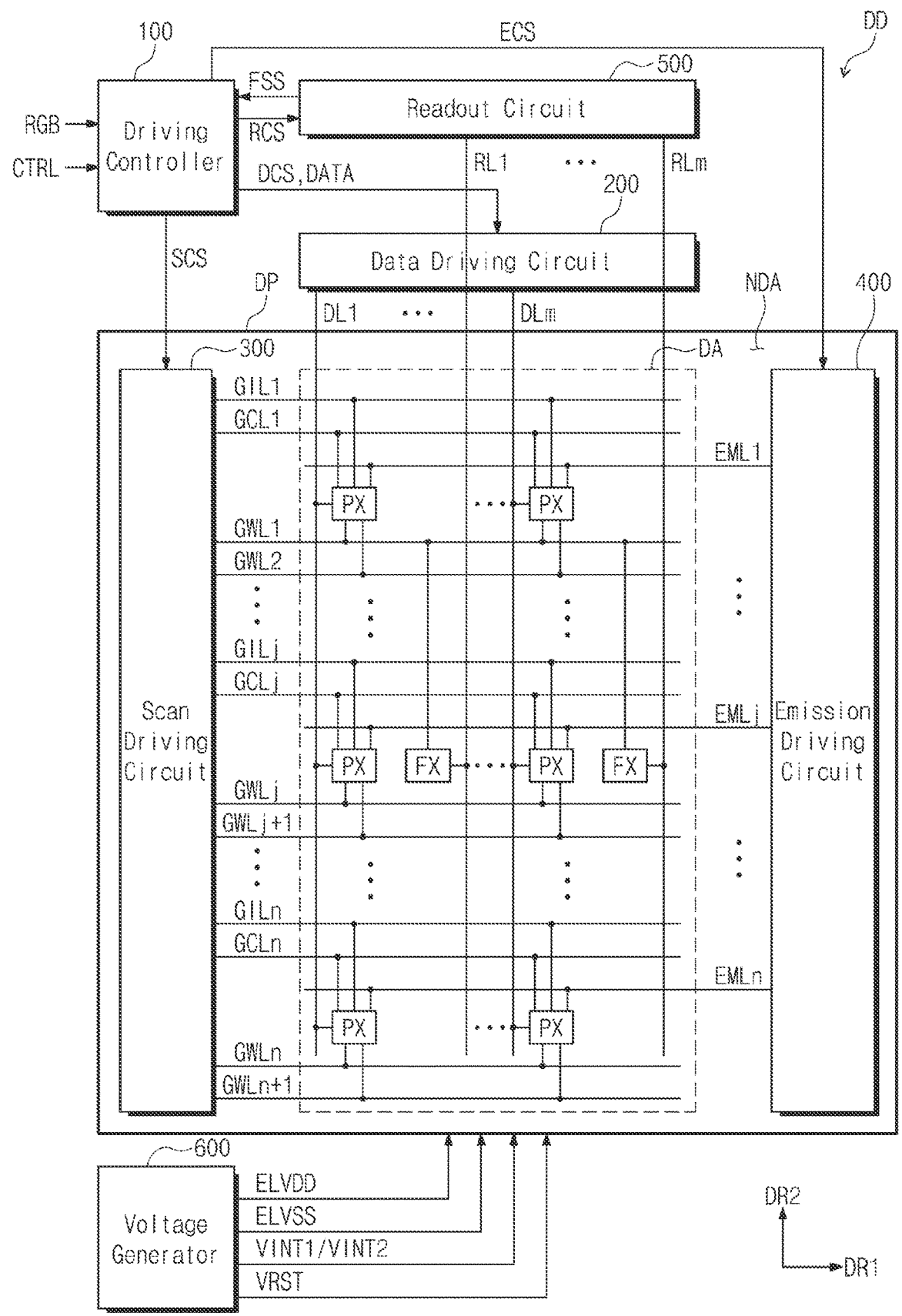
FIG. 3 is a block diagram of a display device, according to an embodiment of the present disclosure.

FIG. 3 is a block diagram of a display device, according to an embodiment of the present disclosure.

Referring to FIG. 3, the display device DD includes the display panel DP, a driving controller 100, a data driving circuit 200, a scan driving circuit 300, an emission driving circuit 400, a readout circuit 500, and a voltage generator 600.

The driving controller 100 receives an image signal RGB and a control signal CTRL. The driving controller 100 generates an image data signal DATA by converting a data format of the image signal RGB so as to be suitable for the interface specification of the data driving circuit 200. The driving controller 100 outputs a scan control signal SCS, a data control signal DCS, and an emission signal ECS.

The data driving circuit 200 receives the data control signal DCS and the image data signal DATA from the driving controller 100. The data driving circuit 200 converts the image data signal DATA into data signals and then outputs the data signals to a plurality of data lines DL1 to DLm, which are described in further detail below. The data signals are analog voltages corresponding to grayscale values of the image data signal DATA.

The voltage generator 600 generates voltages utilized to operate the display panel DP. In an embodiment, the voltage generator 600 generates a first driving voltage ELVDD, a second driving voltage ELVSS, a first initialization voltage VINT1, a second initialization voltage VINT2, and a reset voltage VRST.

The display panel DP includes scan lines GIL1 to GILn, GCL1 to GCLn, and GWL1 to GWLn+1, emission control lines EML1 to EMLn, the data lines DL1 to DLm, readout lines RL1 to RLm, and pixels PX, in which n and m are positive integers.

The display panel DP may include a display area DA corresponding to the transparent area TA (see FIG. 1) and a non-display area NDA corresponding to the bezel area BZA (shown in FIG. 1). The pixels PX and sensors FX may be disposed in the display area DA.

The scan driving circuit 300 and the emission driving circuit 400 may be disposed in the non-display area NDA of the display panel DP. In an embodiment, the scan driving circuit 300 may be arranged on a first side of the display panel DP. The scan lines GIL1 to GILn, GCL1 to GCLn, and GWL1 to GWLn+1 extend from the scan driving circuit 300 in the first direction DR1.

The scan lines GIL1 to GILn, GCL1 to GCLn, and GWL1 to GWLn+1 and the emission control lines EML1 to EMLn are spaced apart from one another in the second direction DR2. The data lines DL1 to DLm extend from the data driving circuit 200 in a direction opposite to the second direction DR2, and are spaced apart from one another in the first direction DR1.

In the example shown in FIG. 3, the scan driving circuit 300 and the emission driving circuit 400 face each other with the pixels PX interposed therebetween, but the present disclosure is not limited thereto. For example, according to embodiments, the scan driving circuit 300 and the emission driving circuit 400 may be disposed adjacent to each other on one of the first side and the second side of the display panel DP. In an embodiment, the scan driving circuit 300 and the emission driving circuit 400 may be implemented with one circuit.

The plurality of pixels PX are electrically connected to the scan lines GIL1 to GILn, GCL1 to GCLn, and GWL1 to GWLn+1, the emission control lines EML1 to EMLn, and the data lines DL1 to DLm. Each of the plurality of pixels PX may be electrically connected to four scan lines and one emission control line. For example, as shown in FIG. 3, pixels PX in a first row may be connected to the scan lines GIL1 GCL1, GWL1, and GWL2 and the emission control line EML1. Furthermore, pixels in a j-th row may be connected to the scan lines GILj, GCLj, GWLj, and GWLj+1 and the emission control line EMLj, where j is a positive integer.

Each of the plurality of pixels PX includes a light emitting element ED (see FIG. 6) and a pixel driving circuit PDC (see FIG. 6) that control the light emission of the light emitting element ED. The pixel driving circuit PDC may include one or more transistors and one or more capacitors. The scan driving circuit 300 and the emission driving circuit 400 may include transistors formed through the same process as the pixel driving circuit PDC.

Each of the plurality of pixels PX receives the first driving voltage ELVDD, the second driving voltage ELVSS, the first initialization voltage VINT1, and the second initialization voltage VINT2 from the voltage generator 600.

The scan driving circuit 300 receives the scan control signal SCS from the driving controller 100. The scan driving circuit 300 may output scan signals to the scan lines GIL1 to GILn, GCL1 to GCLn, and GWL1 to GWLn+1 in response to the scan control signal SCS.

The emission driving circuit 400 is arranged on a second side of the display panel DP. The emission control lines EML1 to EMLn extend from the emission driving circuit 400 in a direction opposite to the first direction DR1. The emission driving circuit 400 may output emission control signals to the emission control lines EML1 to EMLn.

Figure 6:
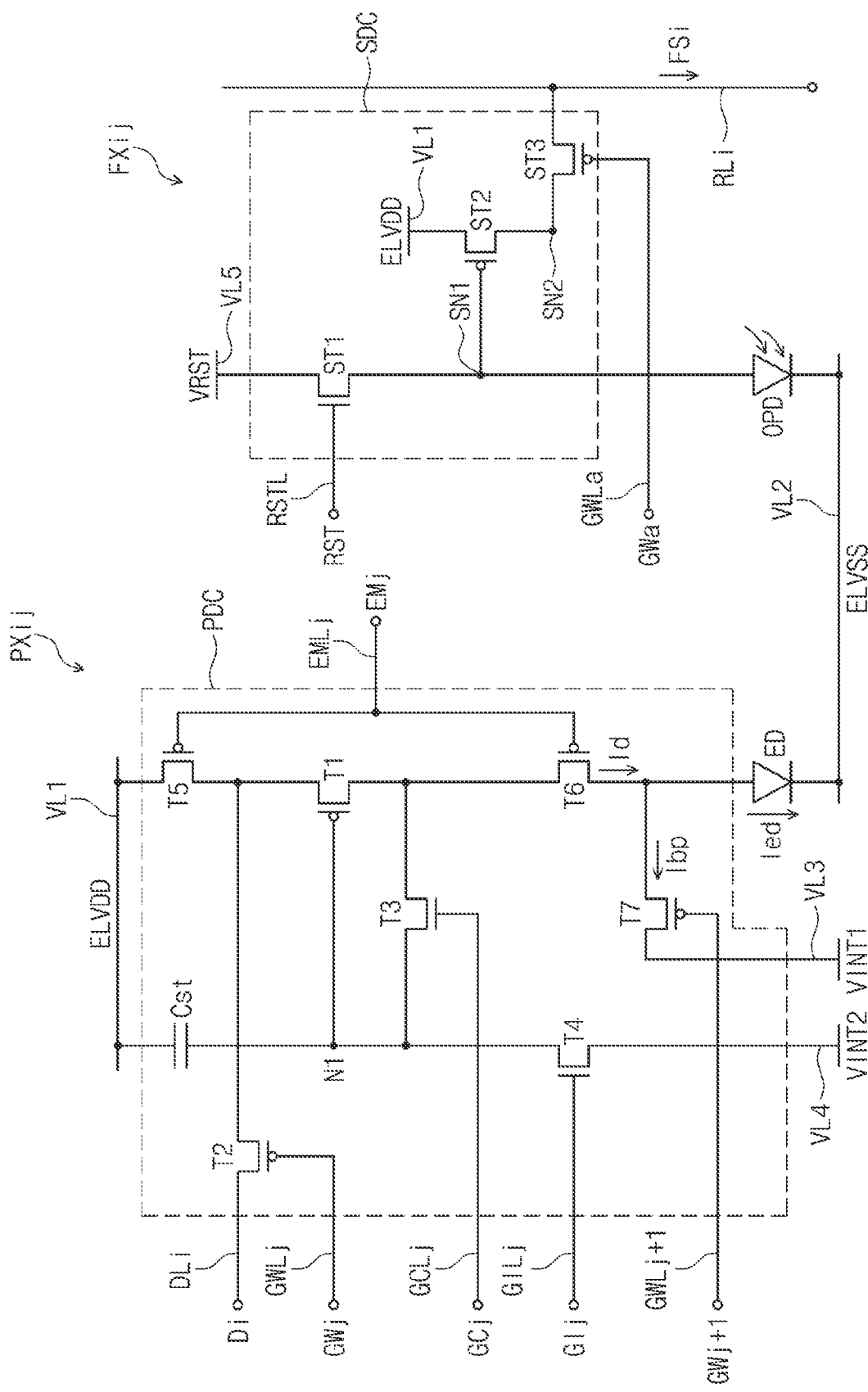
FIG. 6 is a circuit diagram of a pixel and a sensor, according to an embodiment of the present disclosure.

Each of the sensors FX includes a light sensing element OPD (see FIG. 6) and a sensor driving circuit SDC (see FIG. 6). The sensor driving circuit SDC may include one or more transistors. The sensor driving circuit SDC may include transistors formed through the same process as the pixel driving circuit PDC.

Each of the sensors FX may be connected to a corresponding scan line among the scan lines GWL1 to GWLn+1 and a corresponding readout line among the readout lines RL1 to RLm. In an embodiment, the number of the sensors FX may be smaller than the number of pixels PX.

The readout circuit 500 receives a readout control signal RCS from the driving controller 100. The readout circuit 500 may receive a detection signal from the readout lines RL1 to RLm in response to the readout control signal RCS and then may provide a biometric sensing signal FSS to the driving controller 100. The biometric sensing signal FSS provided from the readout circuit 500 to the driving controller 100 may be a fingerprint sensing signal corresponding to a user's fingerprint.

According to embodiments, the readout circuit 500 may provide a reset signal RST (see FIG. 6) to the sensors FX. In an embodiment, the reset signal RST is a signal commonly provided to the sensors FX.

Figure 4A:
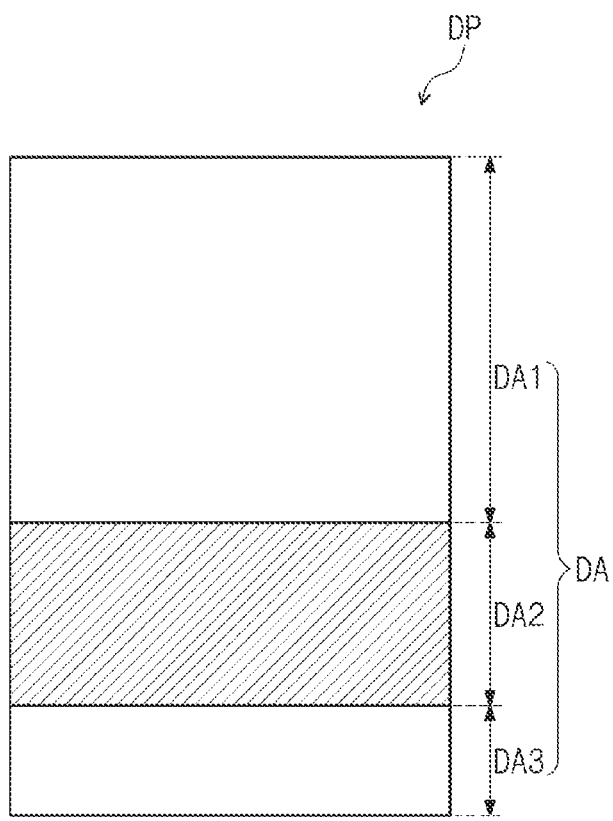
FIGS. 4A and 4B are diagrams illustrating a display area of a display panel, according to embodiments of the present disclosure.
Figure 4B:
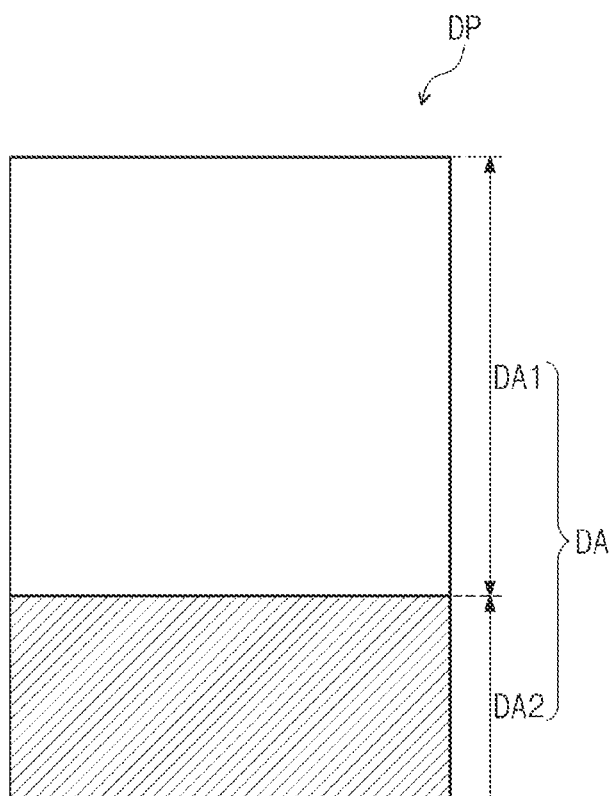

FIGS. 4A and 4B are diagrams illustrating a display area of a display panel, according to embodiments of the present disclosure.

Referring to FIG. 4A, the display area DA includes a first display area DA1, a second display area DA2, and a third display area DA3. The pixels PX shown in FIG. 3 may be disposed in the first display area DA1, the second display area DA2, and the third display area DA3. The sensors FX shown in FIG. 3 may be disposed in the second display area DA2.

In an embodiment, the area sizes of the first display area DA1, the second display area DA2, and the third display area DA3 may be different from one another. In an embodiment, the area size of each of the second display area DA2 and the third display area DA3 may be smaller than the area size of the first display area DA1.

The second display area DA2 may be an area where the sensors FX are disposed, and may be referred to as a "biometric sensing area" or a "fingerprint sensing area".

Referring to FIG. 4B, the display area DA includes the first display area DA1 and the second display area DA2. The pixels PX shown in FIG. 3 may be disposed in the first display area DA1 and the second display area DA2. The sensors FX shown in FIG. 3 may be disposed in the second display area DA2.

In an embodiment, the area sizes of the first display area DA1 and the second display area DA2 may be different from each other. In an embodiment, the area size of the second display area DA2 may be smaller than the area size of the first display area DA1.

The second display area DA2 may be an area where the sensors FX are disposed, and may be referred to as a "biometric sensing area" or a "fingerprint sensing area".

The area size and location of the second display area DA2 in which the sensors FX are disposed are not limited to those illustrated in FIGS. 4A and 4B and may be changed variously. FIG. 4B illustrates that the first display area DA1 is disposed above the second display area DA2. However, the present disclosure is not limited thereto. For example, in an embodiment, the second display area DA2 may be above the first display area DA1. In an embodiment, the display area DA may include the two or more second display areas DA2 in which the sensors FX are disposed.

Figure 5A:
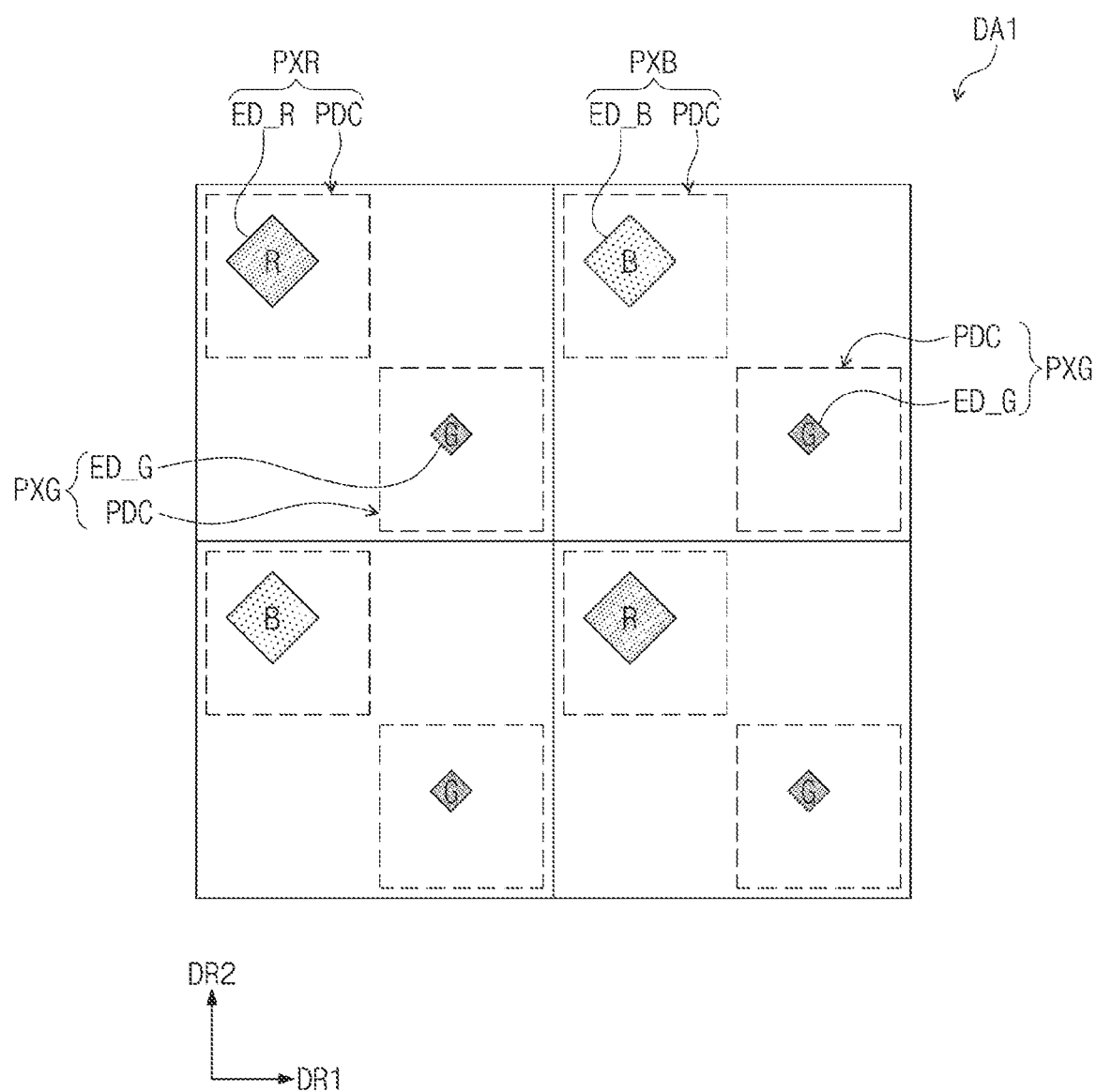
FIGS. 5A, 5B, and 5C are enlarged plan views of a partial area of a display panel, according to embodiments of the present disclosure.
Figure 5B:
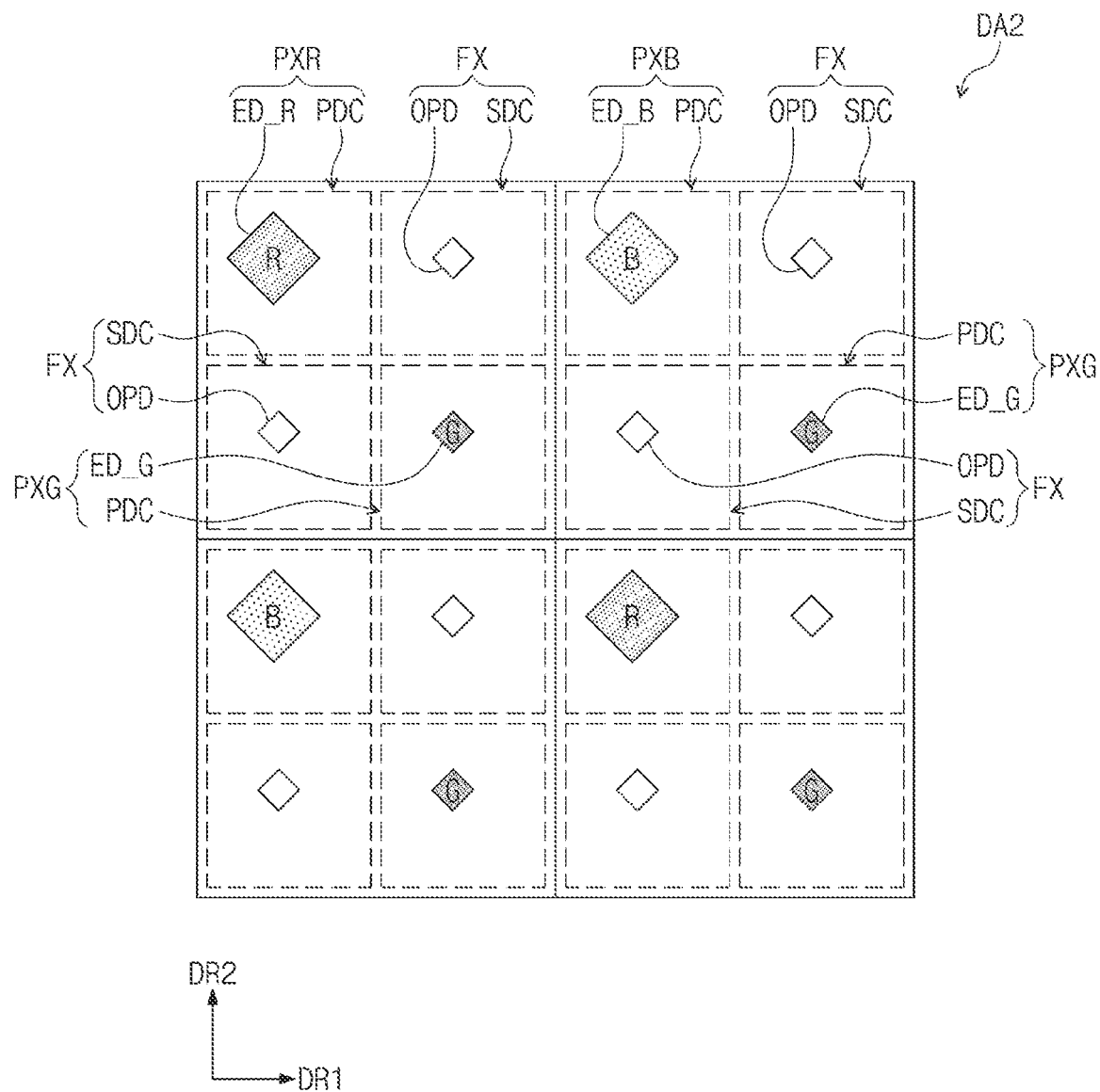
Figure 5C:
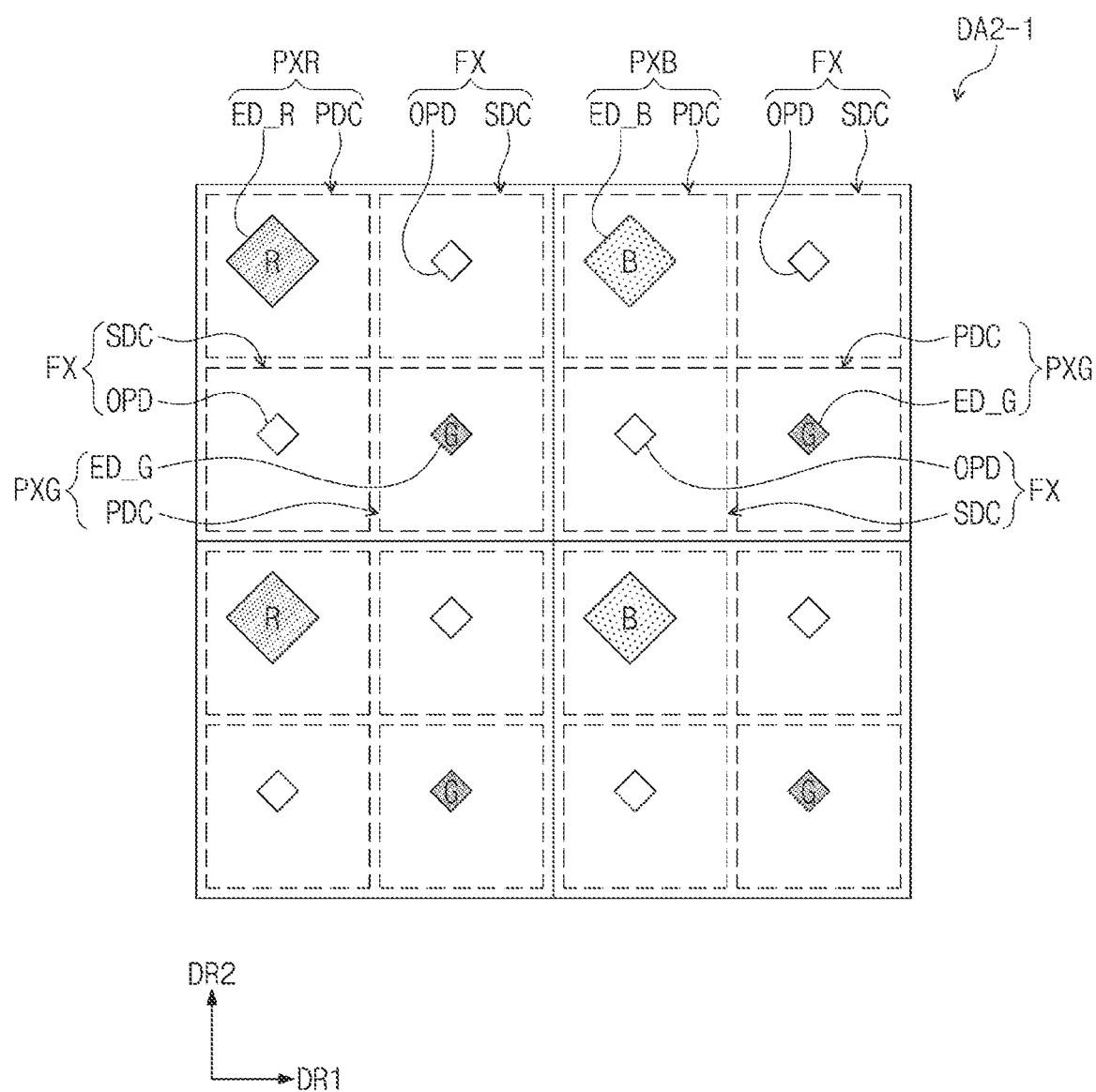

FIGS. 5A, 5B, and 5C are enlarged plan views of a partial area of a display panel, according to embodiments of the present disclosure.

FIG. 5A is an enlarged plan view of the first display area DA1 shown in FIGS. 4A and 4B. A plan view of the third display area DA3 illustrated in FIG. 4A may be the same as a plan view of the first display area DA1.

FIGS. 5B and 5C are enlarged plan views of the second display area DA2 shown in FIGS. 4A and 4B.

Referring to FIG. 5A, pixels PXR, PXG, PXB are arranged in the first display area DA1 of the display panel DP. The pixel PXR includes a first light emitting element ED_R and the pixel driving circuit PDC, the pixel PXG includes a second light emitting element ED_G and the pixel driving circuit PDC, and the pixel PXB includes a third light emitting element ED_B and the pixel driving circuit PDC.

The pixels PXR, PXG, PXB and the sensors FX are alternately arranged in the first direction DR1 and alternately arranged in the second direction DR2. The pixels PXR, PXG, PXB include the first pixels PXR including a light emitting element (hereinafter referred to as a "first light emitting element ED_R") that outputs light of a first color (e.g., red (R)), the second pixels PXG including a light emitting element (hereinafter referred to as a "second light emitting element ED_G") that outputs light of a second color (e.g., green (G)), and the third pixels PXB including a light emitting element (hereinafter referred to as a "third light emitting element ED_B") that outputs light of a third color (e.g., blue (B)).

As shown in FIG. 5A, the first pixels PXR and the third pixels PXB may be alternately and repeatedly arranged in the second direction DR2 as well as in the first direction DR1. The second pixels PXG may be arranged in the first direction DR1 and the second direction DR2. An arrangement structure of the pixels PX is not limited to the embodiment illustrated in FIG. 5A.

In an embodiment of the present disclosure, the first light emitting element ED_R may have a size greater than the second light emitting element ED_G. Moreover, the third light emitting element ED_B may have a size greater than or about equal to that of the first light emitting element ED_R. The size of each of the first to third light emitting elements ED_R, ED_G, ED_B is not limited thereto, and may be variously modified. For example, in an embodiment of the present disclosure, the first to third light emitting elements ED_R, ED_G, ED_B may have the same size as one another.

Furthermore, although it is illustrated that each of the first to third light emitting elements ED_R, ED_G, and ED_B has a quadrangular shape, embodiments of the present disclosure are not limited thereto. For example, according to embodiments, a shape of each of the first to third light emitting elements ED_R, ED_G, and ED_B may be variously transformed into a polygon, a circle, an oval, etc. As another example, the shapes of the first to third light emitting elements ED_R, ED_G, and ED_B may be different from one another. For example, the second light emitting element ED_G may have a circular shape, and the first and third light emitting elements ED_R and ED_B may have a quadrangular shape.

Referring to FIG. 5B, the pixels PXR, PXG, PXB and the sensors FX are arranged in the second display area DA2 of the display panel DP. The pixel PXR includes a first light emitting element ED_R and the pixel driving circuit PDC, the pixel PXG includes a second light emitting element ED_G and the pixel driving circuit PDC, and the pixel PXB includes a third light emitting element ED_B and the pixel driving circuit PDC. Each of the sensors FX includes the light sensing element OPD and the sensor driving circuit SDC.

The pixels PXR, PXG, PXB and the sensors FX are alternately arranged in the first direction DR1 and alternately arranged in the second direction DR2. The pixels PXR, PXG, PXB include the first pixels PXR including a light emitting element (hereinafter referred to as a "first light emitting element ED_R") that outputs light of a first color (e.g., red (R)), the second pixels PXG including a light emitting element (hereinafter referred to as a "second light emitting element ED_G") that outputs light of a second color (e.g., green (G)), and the third pixels PXB including a light emitting element (hereinafter referred to as a "third light emitting element ED_B") that outputs light of a third color (e.g., blue (B)).

As shown in FIG. 5B, the first pixels PXR and the third pixels PXB may be alternately and repeatedly arranged in each of the first and second directions DR1 and DR2. The second pixels PXG may be arranged in the first direction DR1 and the second direction DR2.

Each of the sensors FX may be disposed between the first pixel PXR and the third pixel PXB, which are adjacent to each other, in the first and second directions DR1 and DR2. In addition, each of the sensors FX may be interposed between two second pixels PXG in the first and second directions DR1 and DR2. However, the arrangement structure of the pixels PX and the sensors FX is not limited thereto.

As shown in FIG. 5C, in an embodiment, light emitting elements that output the same light may be arranged in the second direction DR2. For example, the first pixels PXR may be arranged in a first column, the second pixels PXG may be arranged in a second column, the third pixels PXB may be arranged in a third column, and the second pixels PXG may be arranged in a fourth column.

Each of the sensors FX may be interposed between the two first pixels PXR, between the two second pixels PXG, and between the two third pixels PXB, in the second direction DR2. Furthermore, in the first direction DR1, each of the sensors FX may be interposed between the first pixel PXR and the third pixel PXB, which are adjacent to each other, and between the two second pixels PXG. The arrangement structure of the pixels PX and the sensors FX may be variously modified according to embodiments of the present disclosure.

For example, the first pixels PXR and the third pixels PXB may be arranged in different columns or in different rows. When the first pixels PXR are arranged in an odd-numbered column, the third pixels PXB may be arranged in an even-numbered column. When the first pixels PXR are arranged in an odd-numbered row, the third pixels PXB may be arranged in an even-numbered row. In this case, the at least one second pixel PXG and the at least one sensor FX may be interposed between the two first pixels PXR adjacent to each other in the first and second directions DR1 and DR2. Moreover, the at least one second pixel PXG and the at least one sensor FX may be interposed between the two third pixels PXB adjacent to each other in the first and second directions DR1 and DR2.

In an embodiment of the present disclosure, the first light emitting element ED_R may have a size greater than the second light emitting element ED_G. Moreover, the third light emitting element ED_B may have a size greater than or about equal to that of the first light emitting element ED_R. The size of each of the first to third light emitting elements ED_R, ED_G, ED_B is not limited thereto, and may be variously modified. For example, in an embodiment of the present disclosure, the first to third light emitting elements ED_R, ED_G, ED_B may have the same size as one another.

Furthermore, although it is illustrated that each of the first to third light emitting elements ED_R, ED_G, and ED_B has a quadrangular shape, embodiments of the present disclosure are not limited thereto. For example, according to embodiments, a shape of each of the first to third light emitting elements ED_R, ED_G, and ED_B may be variously transformed into a polygon, a circle, an oval, etc. As another example, the shapes of the first to third light emitting elements ED_R, ED_G, and ED_B may be different from one another. For example, the second light emitting element ED_G may have a circular shape, and the first and third light emitting elements ED_R and ED_B may have a quadrangular shape.

The light sensing element OPD may have a smaller size than the first and third light emitting elements ED_R and ED_B. In an embodiment of the present disclosure, the light sensing element OPD may have a size smaller than or about equal to that of the second light emitting element ED_G. However, the size of the light sensing element OPD is not limited thereto, and may be variously modified. Although it is illustrated that the light sensing element OPD has a quadrangular shape, the shape of the light sensing element OPD is not limited thereto. For example, according to embodiments, the shape of the light sensing element OPD may be variously transformed into a polygon, a circle, an oval, etc.

Each of the first to third light emitting elements ED_R, ED_G, and ED_B is electrically connected to the corresponding pixel driving circuit PDC. The pixel driving circuit PDC may include a plurality of transistors and a capacitor. The pixel driving circuits PDC connected to each of the first to third light emitting elements ED_R, ED_G, and ED_B may have the same circuit configuration.

The light sensing element OPD is electrically connected to the corresponding sensor driving circuit SDC. The sensor driving circuit SDC may include a plurality of transistors. In an embodiment of the present disclosure, the sensor driving circuit SDC and the pixel driving circuit PDC may be formed simultaneously through the same process. Furthermore, the scan driving circuit 300 may include transistors formed through the same process as the pixel driving circuit PDC and the sensor driving circuit SDC.

The pixel driving circuit PDC receives the first driving voltage ELVDD, the second driving voltage ELVSS, and the first and second initialization voltages VINT1 and VINT2 from the voltage generator 600. The sensor driving circuit SDC receives the reset voltage VRST and the second driving voltage ELVSS from the voltage generator 600.

FIG. 6 is a circuit diagram of a pixel and a sensor, according to an embodiment of the present disclosure.

FIG. 6 illustrates one pixel PXij among the plurality of pixels PX shown in FIG. 3 and one sensor FXij among the plurality of sensors FX. Each of the plurality of pixels PX shown in FIG. 3 may have the same circuit configuration as the equivalent circuit diagram of the pixel PXij shown in FIG. 6. Moreover, each of the plurality of sensors FX shown in FIG. 3 may have the same circuit configuration as the equivalent circuit diagram of the sensor FXij shown in FIG. 6.

Referring to FIG. 6, the pixel PXij includes the pixel driving circuit PDC and the at least one light emitting element ED. The light emitting element ED may be a light emitting diode. In an embodiment of the present disclosure, the light emitting element ED may be an organic light emitting diode including an organic light emitting layer. The pixel driving circuit PDC according to an embodiment includes first to seventh transistors T1, T2, T3, T4, T5, T6, and T7 and one capacitor Cst.

The third and fourth transistors T3 and T4 among the first to seventh transistors T1 to T7 may be N-type transistors that use an oxide semiconductor as a semiconductor layer. Each of the first, second, fifth, sixth, and seventh transistors T1, T2, T5, T6, and T7 may be a P-type transistor having a low-temperature polycrystalline silicon (LTPS) semiconductor layer. Some of the first to seventh transistors T1 to T7 may be P-type transistors, and the remaining transistors may be N-type transistors that use an oxide semiconductor as a semiconductor layer. In an embodiment, among the first to seventh transistors T1 to T7, the first, second, and fifth to seventh transistors T1, T2, and T5 to T7 are P-type transistors, and the third and fourth transistors T3 and T4 are N-type transistors. In an embodiment, at least one of the first to seventh transistors T1 to T7 may be an N-type transistor and the rest may be P-type transistors. A configuration of the pixel driving circuit PDC according to an embodiment of the present disclosure is not limited to the embodiment illustrated in FIGS. 5A to 5C. The pixel driving circuit PDC illustrated in FIGS. 5A to 5C is only an example. For example, the configuration of the pixel driving circuit PDC may be modified. For example, in an embodiment, all of the first to seventh transistors T1 to T7 may be P-type transistors or N-type transistors.

The scan lines GILj, GCLj, GWLj, and GWLj+1 may deliver scan signals GIj, GCj, GWj, and GWj+1, respectively. The emission control line EMLj may deliver an emission control signal EMj. The data line DLi delivers a data signal Di. The data signal Di may have a voltage level corresponding to the image signal RGB input to the display device DD (see FIG. 3). First to fourth driving voltage lines VL1, VL2, VL3, and VL4 may deliver the first driving voltage ELVDD, the second driving voltage ELVSS, the first initialization voltage VINT1, and the second initialization voltage VINT2, respectively.

The first transistor T1 includes a first electrode connected to the first driving voltage line VL1 via the fifth transistor T5, a second electrode electrically connected to an anode of the light emitting element ED via the sixth transistor T6, and a gate electrode connected to one end of the capacitor Cst. The first transistor T1 may receive the data signal Di delivered by the data line DLi depending on the switching operation of the second transistor T2 and then may supply a driving current Id to the light emitting element ED.

The second transistor T2 includes a first electrode connected to the data line DLi, a second electrode connected to the first electrode of the first transistor T1, and a gate electrode connected to the scan line GWLj. The second transistor T2 may be turned on depending on the scan signal GWj received through the scan line GWLj and then may deliver the data signal Di delivered from the data line DLi to the first electrode of the first transistor T1.

The third transistor T3 includes a first electrode connected to the gate electrode of the first transistor T1, a second electrode connected to the second electrode of the first transistor T1, and a gate electrode connected to the scan line GCLj. The third transistor T3 may be turned on depending on the scan signal GCj received through the scan line GCLj, and thus, the gate electrode and the second electrode of the first transistor T1 may be connected. Thus, the first transistor T1 may be diode-connected.

The fourth transistor T4 includes a first electrode connected to the gate electrode of the first transistor T1, a second electrode connected to the fourth driving voltage line VL4 through which the second initialization voltage VINT2 is supplied, and a gate electrode connected to the scan line GILj. The fourth transistor T4 may be turned on depending on the scan signal GIj received through the scan line GILj and then may perform an initialization operation of initializing a voltage of the gate electrode of the first transistor T1 by supplying the second initialization voltage VINT2 to the gate electrode of the first transistor T1.

The fifth transistor T5 includes a first electrode connected to the first driving voltage line VL1, a second electrode connected to the first electrode of the first transistor T1, and a gate electrode connected to the emission control line EMLj.

The sixth transistor T6 includes a first electrode connected to the second electrode of the first transistor T1, a second electrode connected to the anode of the light emitting element ED, and a gate electrode connected to the emission control line EMLj.

The fifth transistor T5 and the sixth transistor T6 may be simultaneously turned on depending on the emission control signal EMj received through the emission control line EMLj. In this way, the first driving voltage ELVDD may be compensated through the first transistor T1 (which may thus be diode-connected) and may be supplied to the light emitting element ED.

The seventh transistor T7 includes a first electrode connected to the second electrode of the sixth transistor T6, a second electrode connected to the third driving voltage line VL3, and a gate electrode connected to the scan line GWLj+1. The seventh transistor T7 is turned on depending on the scan signal GWj+1 received through the scan line GWLj+1, and bypasses a current of the anode of the light emitting element ED to the third driving voltage line VL3.

As described above, one end of the capacitor Cst is connected to the gate electrode of the first transistor T1, and the other end of the capacitor Cst is connected to the first driving voltage line VL1. The cathode of the light emitting element ED may be connected to the second driving voltage line VL2 that delivers the second driving voltage ELVSS. A structure of the pixel PXij according to an embodiment is not limited to the structure shown in FIG. 6. The number of transistors included in the one pixel PXij, the number of capacitors included in the one pixel PXij, and the connection relationship thereof may be variously modified.

The sensor FXij includes the light sensing element OPD and the sensor driving circuit SDC. The light sensing element OPD may be a photodiode. In an embodiment of the present disclosure, the light sensing element OPD may be an organic photodiode including an organic material, as a photoelectric conversion layer. An anode of the light sensing element OPD may be connected to a first sensing node SN1, and a cathode of the light sensing element OPD may be connected to the second driving voltage line VL2 that delivers the second driving voltage ELVSS.

The sensor driving circuit SDC includes three transistors ST1 to ST3. The three transistors ST1 to ST3 may be a reset transistor ST1, an amplification transistor ST2, and an output transistor ST3, respectively. A part of the reset transistor ST1, the amplification transistor ST2, and the output transistor ST3 may be a P-type transistor. Another part thereof may be an N-type transistor. In an embodiment of the present disclosure, the amplification transistor ST2 may be a P-type transistor, and the reset transistor ST1 and the output transistor ST3 may be N-type transistors. However, the present disclosure is not limited thereto. For example, according to embodiments, all of the reset transistor ST1, the amplification transistor ST2, and the output transistor ST3 may be entirely N-type transistors or entirely P-type transistors.

A part (e.g., the reset transistor ST1) of the reset transistor ST1, the amplification transistor ST2, and the output transistor ST3 may be a transistor having the same type as each of the third and fourth transistors T3 and T4 of the pixel PXij. Some (e.g., the amplification transistor ST2 and the output transistor ST3) of the reset transistor ST1, the amplification transistor ST2, and the output transistor ST3 may be transistors of the same type as the first and second transistors T1 and T2 of the pixel PXij.

The circuit configuration of the sensor driving circuit SDC according to an embodiment of the present disclosure is not limited to that illustrated in FIG. 6. That is, the sensor driving circuit SDC illustrated in FIG. 6 is only an example, and the configuration of the sensor driving circuit SDC may be modified.

The reset transistor ST1 includes a first electrode connected to a reset voltage line VL5 that receives a reset voltage VRST, a second electrode connected to a first sensing node SN1, and a gate electrode connected to a reset line RSTL that receives a reset signal RST. The reset transistor ST1 may reset the potential of the first sensing node SN1 to a reset voltage VRST in response to the reset signal RST. In an embodiment of the present disclosure, the reset signal RST may be a pulse signal that transitions to an active level (e.g., a high level) at the start of one frame. In an embodiment, the reset voltage VRST may have a voltage level lower than the second driving voltage ELVSS.

The amplification transistor ST2 includes a first electrode connected to the first driving voltage line VL1 that receives the first driving voltage ELVDD, a second electrode connected to a second sensing node SN2, and a gate electrode connected to the first sensing node SN1. The amplification transistor ST2 may be turned on depending on the potential of the first sensing node SN1 so as to apply the first driving voltage ELVDD to the second sensing node SN2.

The first electrode of the amplification transistor ST2 may receive the first initialization voltage VINT1 instead of the first driving voltage ELVDD.

The output transistor ST3 includes a first electrode connected to the second sensing node SN2, a second electrode connected to the readout line RLi, and a gate electrode connected to the scan line GWLa that receives the scan signal GWa. The output transistor ST3 may transmit a detection signal FSi to the readout line RLi in response to the scan signal GWa.

Figure 7:
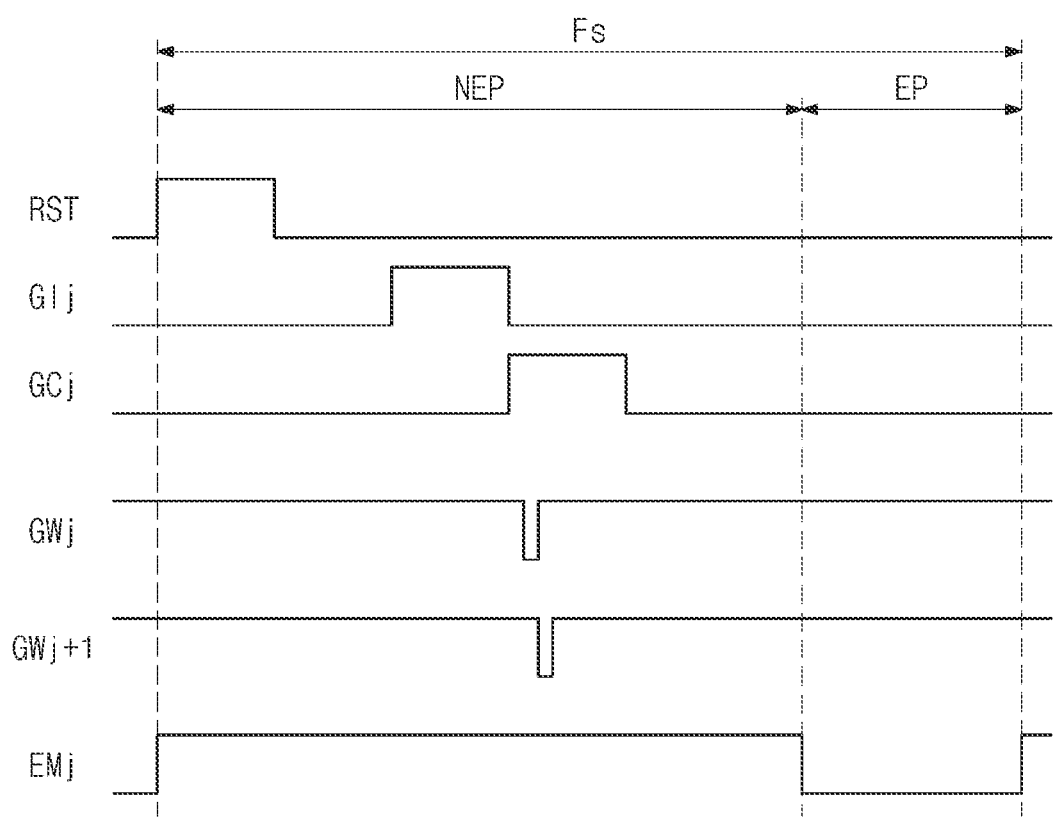
FIG. 7 is a timing diagram for describing an operation of the pixel and the sensor shown in FIG. 6, according to an embodiment of the present disclosure.

FIG. 7 is a timing diagram for describing an operation of the pixel and the sensor shown in FIG. 6, according to an embodiment of the present disclosure.

Referring to FIGS. 6 and 7, one frame Fs may include an emission period EP and a non-emission period NEP depending on an operation of the pixel PXij. The emission period EP may correspond to a low-level period (e.g., an active period) of the emission control signal EMj. The non-emission period NEP may correspond to a high-level period (e.g., an inactive period) of the emission control signal EMj.

The non-emission period NEP may include an initialization period and a data programming and compensation period.

When the scan signal GIj having a high level is provided through the scan line GILj during the initialization period, the fourth transistor T4 is turned on. The second initialization voltage VINT2 is delivered to the gate electrode of the first transistor T1 through the fourth transistor T4 so as to initialize the first transistor T1.

Next, when the scan signal GCj having a high level is supplied through the scan line GCLj during the data programming and compensation period, the third transistor T3 is turned on. The first transistor T1 is diode-connected by the third transistor T3 that is turned on and is forward-biased. At this time, when the scan signal GWj having a low level is supplied through the scan line GWLj, the second transistor T2 is turned on. In this case, a compensation voltage, which is obtained by reducing the voltage of the data signal Di supplied from the data line DLi by a threshold voltage of the first transistor T1, is applied to the gate electrode of the first transistor T1. That is, a gate voltage applied to the gate electrode of the first transistor T1 may be a compensation voltage.

As the first driving voltage ELVDD and the compensation voltage are respectively applied to opposite ends of the capacitor Cst, a charge corresponding to a difference between the first driving voltage ELVDD and the compensation voltage may be stored in the capacitor Cst.

Meanwhile, the seventh transistor T7 is turned on in response to the scan signal GWj+1 having a low level delivered through the scan line GWLj+1. A part of the driving current Id may be drained through the seventh transistor T7 as a bypass current Ibp.

When the light emitting element ED emits light under the condition that a minimum current of the first transistor T1 flows as a driving current for the purpose of displaying a black image, the black image may not be normally displayed. Accordingly, the seventh transistor T7 in the pixel PXij according to an embodiment of the present disclosure may drain (or disperse) a part of the minimum current of the first transistor T1 to a current path, which is different from a current path to the light emitting element ED, as the bypass current Ibp. Herein, the minimum current of the first transistor T1 means a current flowing under the condition that a gate-source voltage of the first transistor T1 is smaller than the threshold voltage, that is, the first transistor T1 is turned off. As a minimum driving current (e.g., a current of about 10 pA or less) is delivered to the light emitting element ED, with the first transistor T1 turned off, an image of black luminance is expressed. When the minimum driving current for displaying a black image flows, the influence of a bypass transfer of the bypass current Ibp may be great. On the other hand, when a large driving current for displaying an image such as a normal image or a white image flows, there may be almost no influence of the bypass current Ibp. Accordingly, when a driving current for displaying a black image flows, a light emitting current Ied of the light emitting element ED, which corresponds to a result of subtracting the bypass current Ibp drained through the seventh transistor T7 from the driving current Id, may have a minimum current amount to such an extent as to accurately express a black image. Accordingly, a contrast ratio may be improved by implementing an accurate black luminance image by using the seventh transistor T7. In an embodiment, the bypass signal is the scan signal GWj+1 having a low level, but is not necessarily limited thereto.

Next, during the emission period EP, the emission control signal EMj supplied from the emission control line EMLj is changed from a high level to a low level. During the emission period EP, the fifth transistor T5 and the sixth transistor T6 are turned on by the emission control signal EMj having a low level. In this case, the driving current Id is generated depending on a voltage difference between the gate voltage of the gate electrode of the first transistor T1 and the first driving voltage ELVDD and is supplied to the light emitting element ED through the sixth transistor T6, and the current Ied flows through the light emitting element ED.

When the reset signal RST transitions to a high level at the start of one frame Fs, the reset transistor ST1 may be turned on such that a voltage of the first sensing node SN1 is capable of being initialized to the reset voltage VRST.

A light exposure period of the sensor FXij may correspond to the emission period EP of the pixel PXij. During the emission period EP, the emission control signal EMj is maintained at a low level. The light sensing element OPD is exposed to light during the emission period EP. The light may be light output from the light emitting element ED of the pixel PXij.

When a user's hand US_F (see FIG. 1) touches a display surface, the light sensing element OPD may generate photocharges corresponding to light reflected by a valley between ridges of a fingerprint, and the generated photocharges may be accumulated in the first sensing node SN1.

The amplification transistor ST2 may be a source follower amplifier that generates a source-drain current in proportion to the amount of charges of the first sensing node SN1, which are input to a gate electrode of the amplification transistor ST2.

While a scan signal GWa is at an inactive level, that is, a high level, the output transistor ST3 remains turned off. When the scan signal GWa transitions to an active level, that is, a low level, the output transistor ST3 is turned on. When the output transistor ST3 is turned on, the detection signal FSi corresponding to a current flowing through the amplification transistor ST2 may be output to the readout line RLi.

As such, the display panel DP may include the pixel PXij and the sensor FXij. The sensor FXij may be driven by using the scan signal for driving the pixel PXij. For example, an initialization scan signal GIj and a compensation scan signal GCj supplied to the second transistor T2 of the pixel PXij may be supplied to the reset transistor ST1 and the output transistor ST3 of the sensor FXij. Accordingly, a separate signal wire or circuit required to drive the sensor FXij is unnecessary according to embodiments of the present disclosure, thereby reducing or preventing a reduction in an aperture ratio even though the sensor FXij is disposed on the display panel DP.

Figure 8:
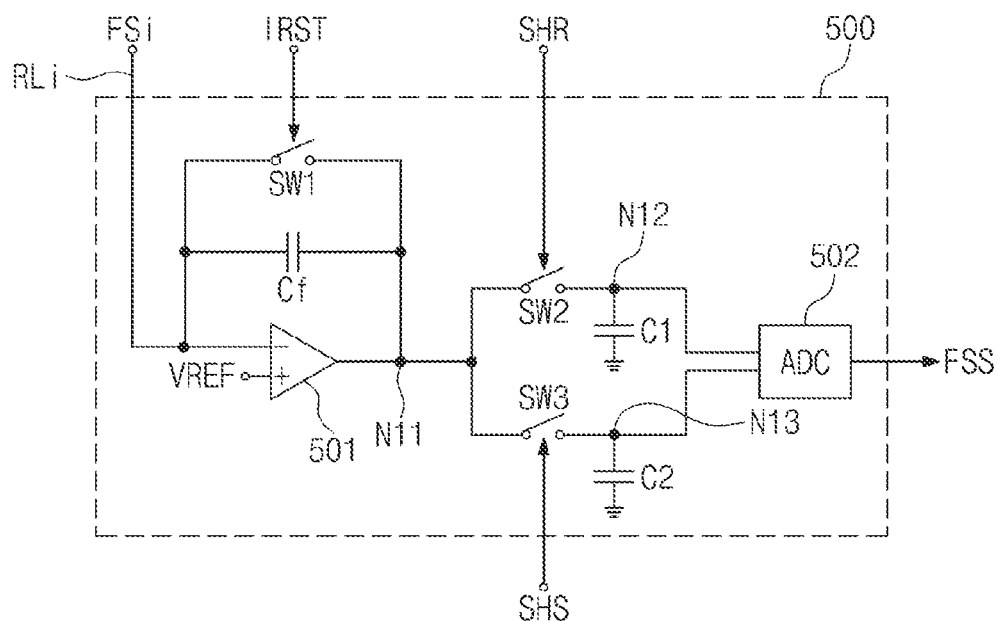
FIG. 8 is a block diagram of a readout circuit shown in FIG. 3, according to an embodiment of the present disclosure.

FIG. 8 is a block diagram of the readout circuit 500 shown in FIG. 3, according to an embodiment of the present disclosure.

Referring to FIG. 8, the readout circuit 500 includes a comparator 501, switches SW1, SW2, and SW3, capacitors Cf, C1, and C2, and an analog-to-digital converter 502.

The comparator 501 includes a first input terminal connected to the readout line RLi, a second input terminal receiving a reference voltage VREF, and an output terminal connected to a first node N11.

The switch SW1 is connected between the first input terminal of the comparator 501 and the first node N11. The switch SW1 may be turned on/off in response to an input reset signal IRST. The capacitor Cf is connected between the first input terminal of the comparator 501 and the first node N11.

The switch SW2 is connected between the first node N11 and the second node N12. The switch SW2 may be turned on/off in response to a first switching signal SHR. The capacitor C1 is connected between the second node N12 and the ground voltage.

The switch SW3 is connected between the first node N11 and a third node N13. The switch SW3 may be turned on/off in response to a second switching signal SHS. The capacitor C2 is connected between the third node N13 and the ground voltage.

The analog-to-digital converter 502 receives a signal from the second node N12 and a signal from the third node N13, and outputs the received signal as the biometric sensing signal FSS, which is a digital signal. The biometric sensing signal FSS may be provided to the driving controller 100 illustrated in FIG. 3.

Figure 9:
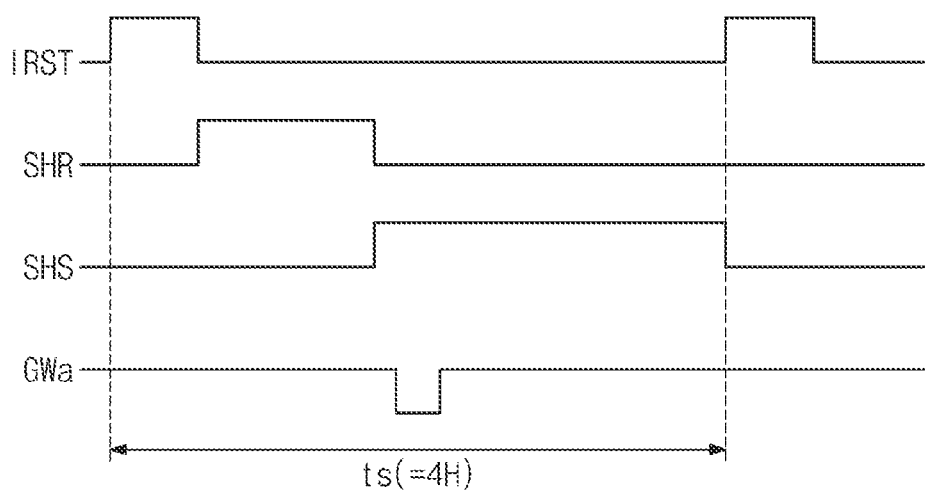
FIG. 9 is a waveform diagram for describing an operation of a readout circuit shown in FIG. 8, according to an embodiment of the present disclosure.

FIG. 9 is a waveform diagram for describing an operation of the readout circuit 500 shown in FIG. 8, according to an embodiment of the present disclosure.

Referring to FIGS. 8 and 9, when the input reset signal IRST transitions to a high level, the switch SW1 is turned on. As the switch SW1 is turned on, the first input terminal of the comparator 501 and the first node N11 are electrically connected, and the first node N11 may be initialized.

While the first switching signal SHR is at a high level, and the second switching signal SHS is at a low level, after the input reset signal IRST transitions to a low level, the detection signal FSi transmitted through the readout line RLi may be stored in the second node N12 by the capacitor C1. The scan signal GWa is at a high level while the first switching signal SHR is at a high level, and thus, the signal stored in the second node N12 may be a reset sampling signal.

Subsequently, while the first switching signal SHR is at a low level, and the second switching signal SHS is at a high level, the detection signal FSi transmitted through the readout line RLi may be stored in the third node N13 by the capacitor C2. While the scan signal GWa is at a low level, the detection signal FSi transmitted through the readout line RLi may correspond to the amount of light sensed by the light sensing element OPD. Accordingly, a signal stored in the third node N13 may be a detection sampling signal.

The analog-to-digital converter 502 converts a difference between the reset sampling signal of the second node N12 and the detection sampling signal of the third node N13 into a digital signal. The analog-to-digital converter 502 may output the biometric sensing signal FSS, which is a digital signal.

For the readout circuit 500 to accurately detect the detection signal FSi transmitted through the readout line RLi, a detection time is from a point in time when the input reset signal IRST transitions from the low level to the high level until the second switching signal SHS transitions from the high level to the low level is sufficiently secured in embodiments of the present disclosure.

Figure 10:
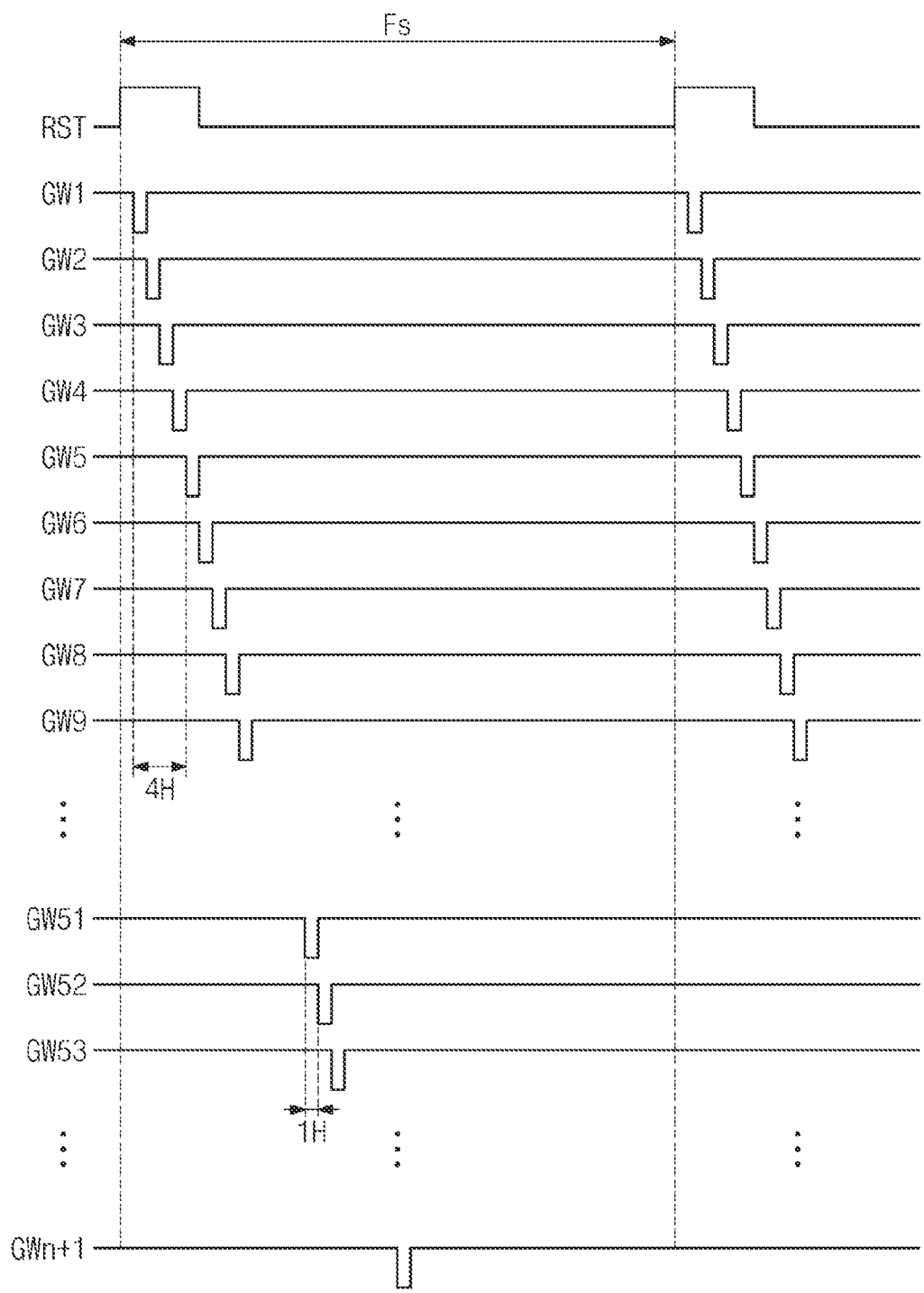
FIG. 10 is a timing diagram of scan signals and a reset signal provided to a pixel and a sensor shown in FIG. 6, according to an embodiment of the present disclosure.

FIG. 10 is a timing diagram of scan signals GW1 to GWn+1 and the reset signal RST provided to the pixel PXij and the sensor FXij shown in FIG. 6, according to an embodiment of the present disclosure.

Referring to FIGS. 6 and 10, the reset signal RST is activated to a high level at the start of one frame Fs. The scan signals GW1 to GWn+1 sequentially transition to an active level (e.g., a low level). A time interval until the (j+1)-th scan signal GWj+1 transitions to the active level after the j-th scan signal GWj transitions to the active level is one horizontal period (1H).

In an embodiment, when the detection time is described in FIG. 9 is at least 4 horizontal period (4H), the readout circuit 500 may accurately detect the detection signal FSi delivered through the readout line RLi.

When the sensor FXij positioned in a j-th row operates in response to the j-th scan signal GWj and a sensor FXij+1 positioned in a (j+1)-th row operates in response to the (j+1)-th scan signal GWj+1, the readout circuit 500 may not accurately detect the detection signal FSi detected by the sensors FXij and FXij+1.

In an embodiment, the sensor FXij operates in response to the a-th scan signal GWa among the scan signals GW1 to GWn+1. Herein, a is a positive integer different from j.

Figure 11A:
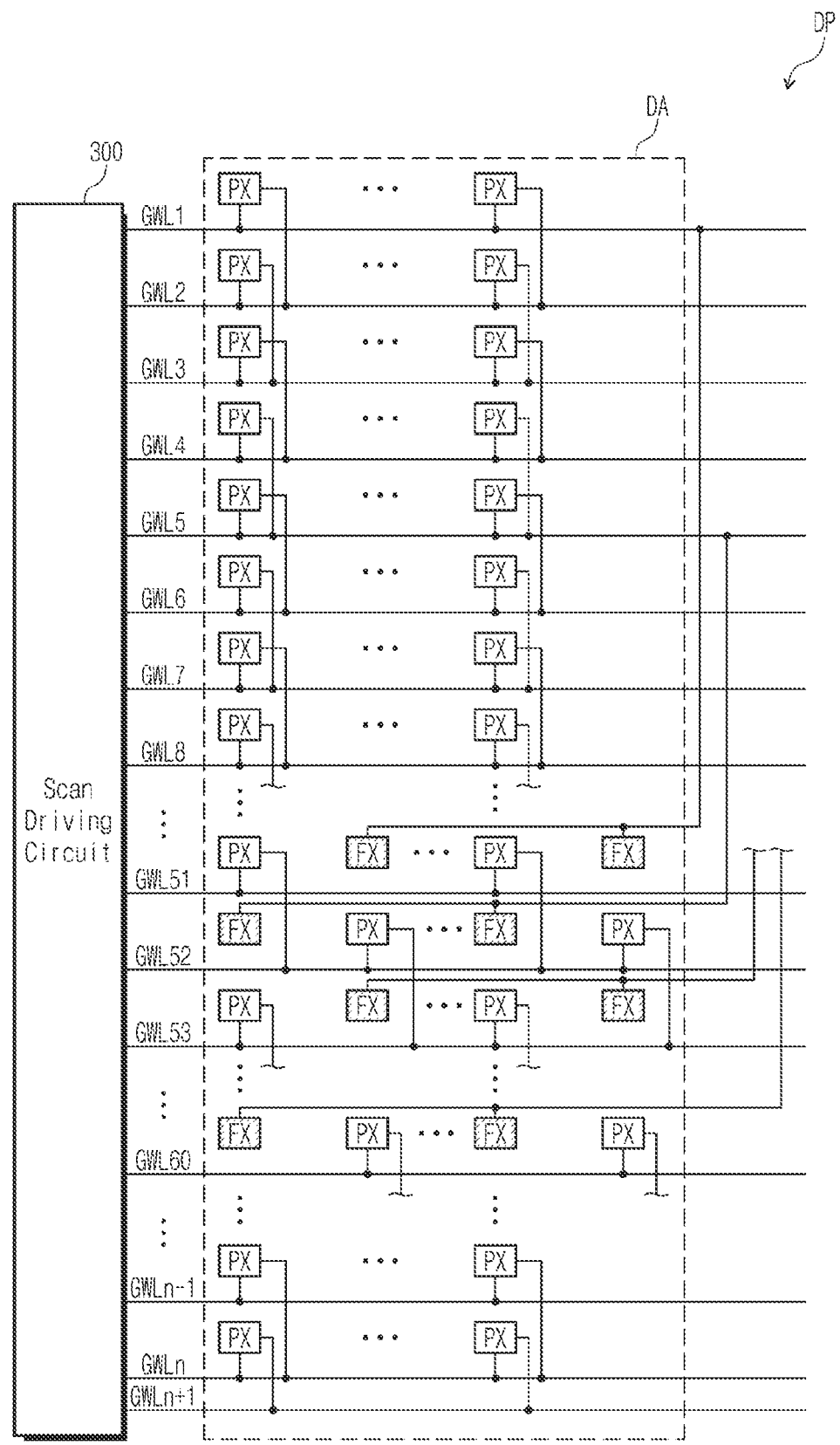
FIGS. 11A to 11C are diagrams illustrating a display panel, according to embodiments of the present disclosure.
Figure 11B:
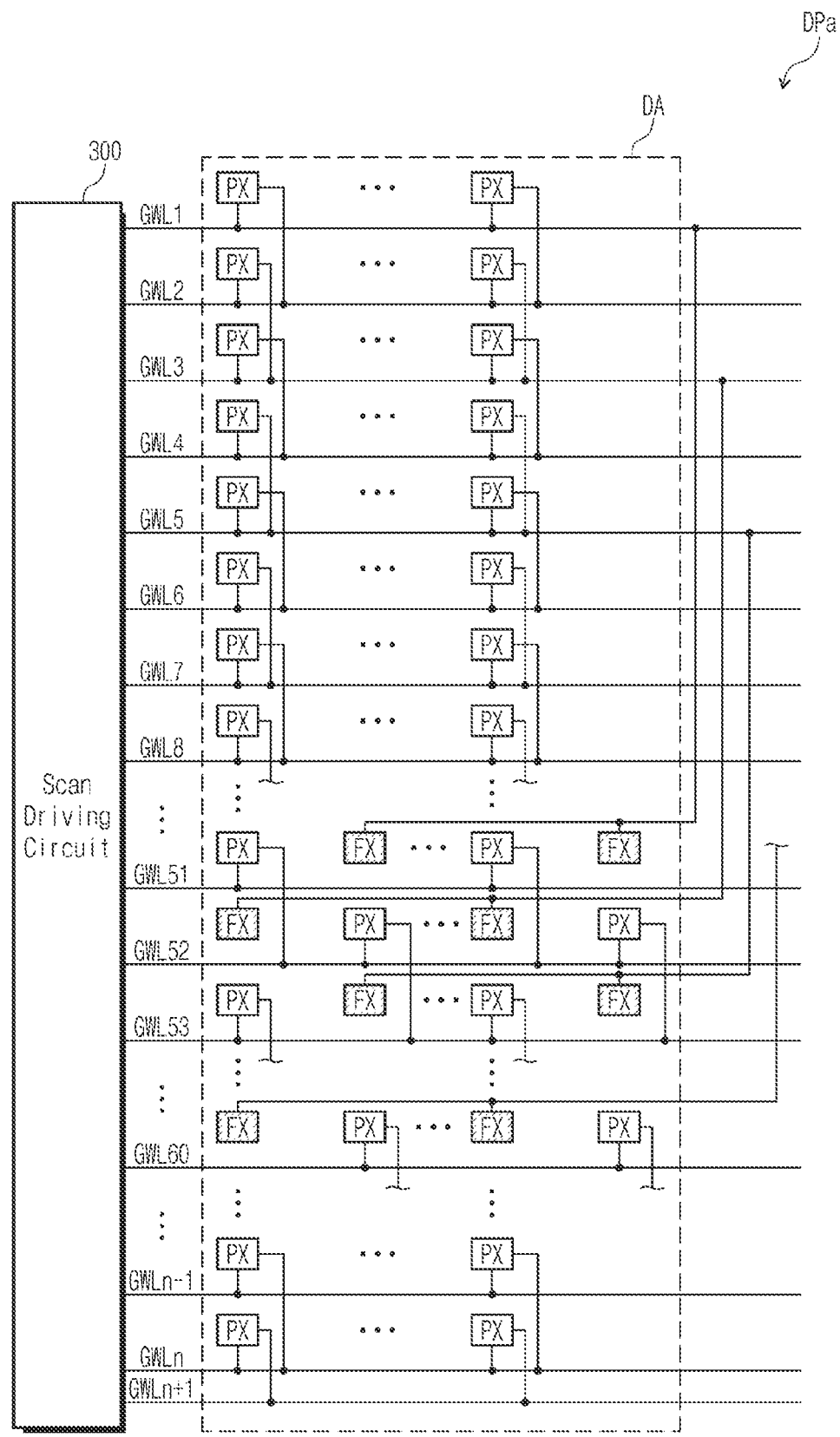
Figure 11C:
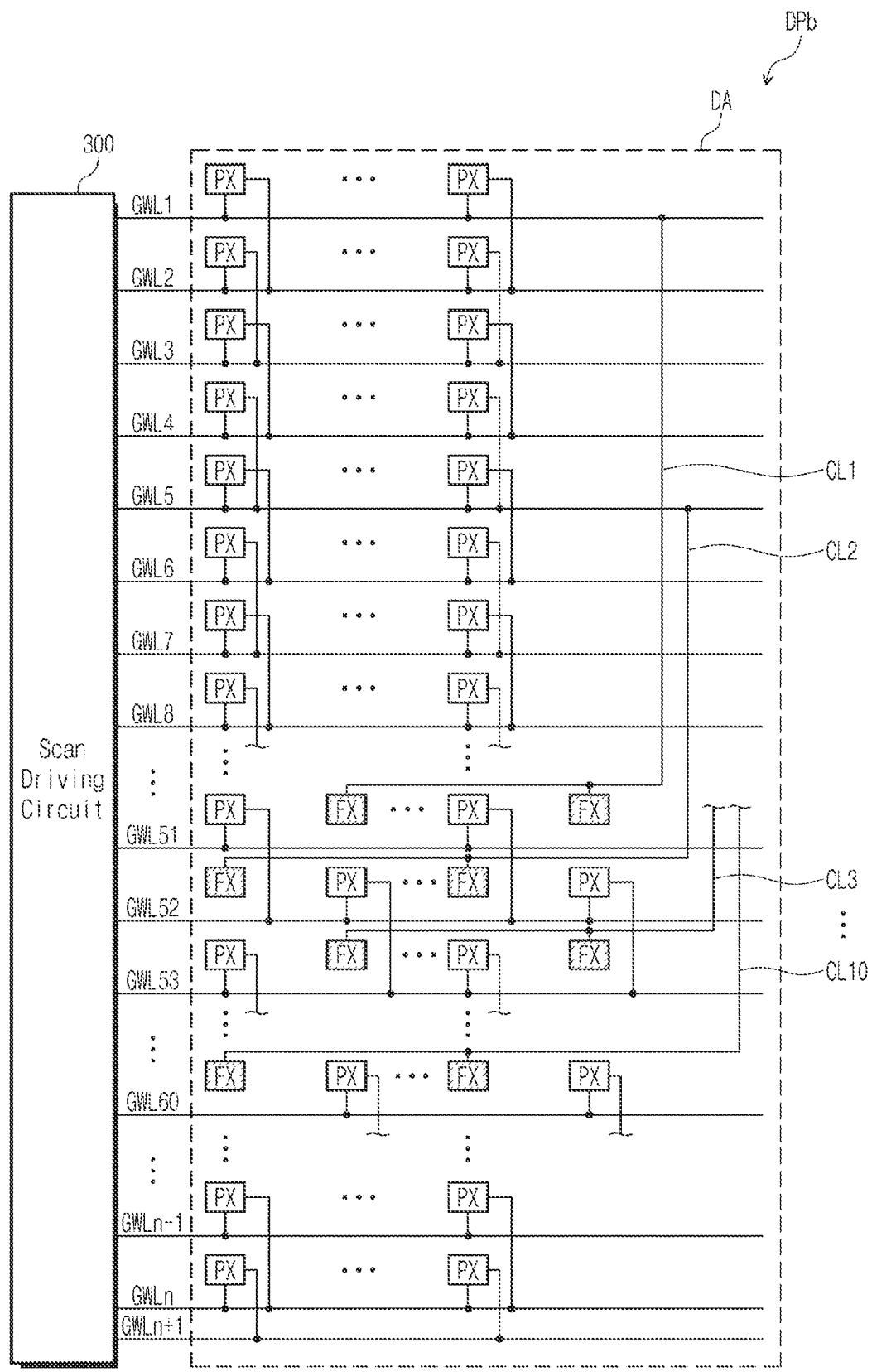

FIGS. 11A to 11C are diagrams illustrating a display panel, according to embodiments of the present disclosure.

FIG. 11A is a block diagram of the display panel DP, according to an embodiment.

Referring to FIG. 11A, the scan driving circuit 300 is arranged on one side of the display area DA in the display panel DP. In an embodiment, the scan driving circuit 300 may be arranged on a left side of the display area DA.

The pixels PX in a j-th row among the pixels PX are connected to the j-th scan line GWLj. For example, the pixels PX in the first row are connected to the first scan line GWL1, the pixels PX in the 51st row are connected to the 51st scan line GWL51, and the pixels PX in the 52nd row are connected to the 52nd scan line GWL52.

Sensors FX in the j-th row among the sensors FX are connected to the a-th scan line GWLa. For example, when the detection time ts described in FIG. 9 is 4 horizontal periods (4H), the sensors FX in the 51st row may be connected to the first scan line GWL1, the sensors FX in the 52nd row may be connected to the fifth scan line GWL5, and the sensors FX in the 60th row may be connected to the 37th scan line GWL37.

Although it is illustrated and described that the sensors FX are arranged in the 51st to 60th rows, this is only an example, and embodiments of the present disclosure are not limited thereto. For example, rows in which each of the sensors FX are arranged may be changed in various manners. Further, according to embodiments, the sensors FX arranged in the 51st row are not connected to the first scan line GWL1, but may be connected to another scan line. For example, when the sensors FX arranged in the 51st row are connected to the scan line GWL35, the sensors FX arranged in the 52nd row may be connected to the 39th scan line GWL39. For example, to sufficiently secure the detection time ts, the sensors FX in the j-th line are connected to the a-th scan line GWLa, and the sensors FX in the (j+1)-th line are connected to the b-th scan line GWLb. Here, 'a' is a positive integer different from 'j', and 'b' is a positive integer different from 'a' and 'j+1'. Furthermore, to sufficiently secure the detection time ts, 'b' may be greater than 'a' by 2 or more.

FIG. 11B is a block diagram of a display panel DPa, according to an embodiment.

Referring to FIG. 11B, the pixels PX in a j-th row among the pixels PX are connected to the j-th scan line GWLj. For example, the pixels PX in the first row are connected to the first scan line GWL1, the pixels PX in the 51st row are connected to the 51st scan line GWL51, and the pixels PX in the 52nd row are connected to the 52nd scan line GWL52.

Sensors FX in the j-th row among the sensors FX are connected to the a-th scan line GWLa. For example, when the detection time is described in FIG. 9 is 2 horizontal periods (2H), the sensors FX in the 51st row may be connected to the first scan line GWL1, the sensors FX in the 52nd row may be connected to the third scan line GWL3, and the sensors FX in the 60th row may be connected to the nineteenth scan line GWL19.

FIG. 11C is a block diagram of a display panel DPb, according to an embodiment.

Referring to FIG. 11C, the sensors FX in the j-th row among the sensors FX are connected to the a-th scan line GWLa. For example, the sensors FX in the 51st row are connected to the first scan line GWL1, the sensors FX in the 52nd row are connected to the fifth scan line GWL5, and the sensors FX in the 60th row are connected to the 37th scan line GWL37.

A connection wire CL1 connecting the first scan line GWL1 and the sensors FX in the 51st row, a connection wire CL2 connecting the fifth scan line GWL5 and the sensors FX in the 52nd row, a connection wire CL3 connecting the ninth scan line GWL9 and the sensors FX in the 53rd row, and a connection wire CL10 connecting the 37th scan line GWL37 and the sensors FX in the 60th row may be arranged in the display area DA. In an embodiment, as shown in FIGS. 11A and 11B, the connection wires CL1 to CL10 may be arranged outside of the display area DA, that is, in the non-display area NDA shown in FIG. 3.

Figure 12:
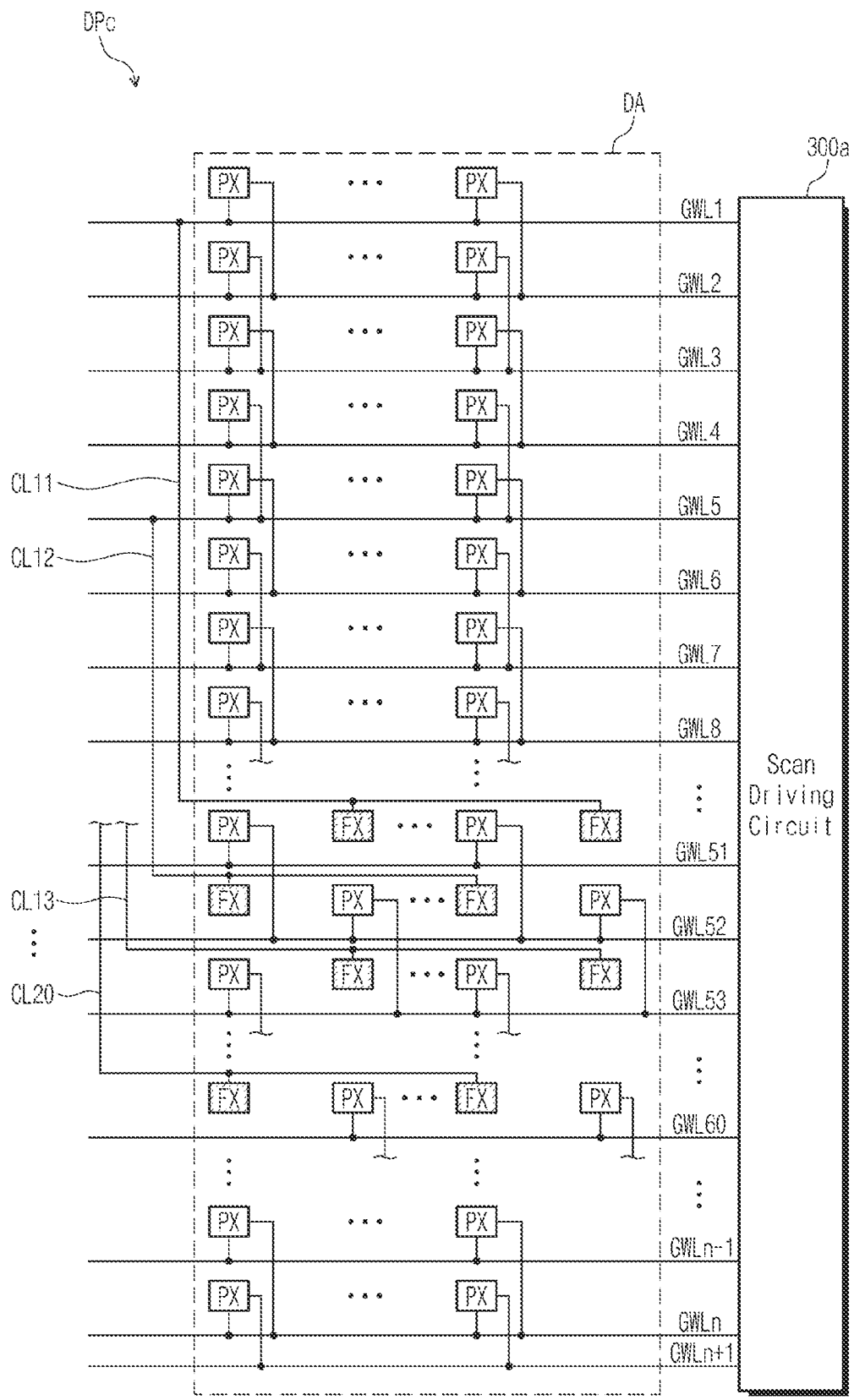
FIG. 12 is a block diagram of a display panel, according to an embodiment of the present disclosure.

FIG. 12 is a block diagram of a display panel DPc, according to an embodiment.

In the example shown in FIG. 12, a scan driving circuit 300a is arranged on one side of the display area DA. In an embodiment, the scan driving circuit 300a may be arranged on a right side of the display area DA.

Connections between the pixels PX and the sensors FX and the scan lines GWL1 to GWLn+1 may be the same as those described with reference to FIGS. 11A to 11C.

A connection wire CL11 connecting the first scan line GWL1 and the sensors FX in the 51st row, a connection wire CL12 connecting the fifth scan line GWL5 and the sensors FX in the 52nd row, a connection wire CL13 connecting the ninth scan line GWL9 and the sensors FX in the 53rd row, and a connection wire CL20 connecting the 37th scan line GWL37 and the sensors FX in the 60th row may be arranged outside of the display area DA, that is, in the non-display area NDA shown in FIG. 3. The connection wires CL11 to CL20 may be arranged in the display area DA.

FIGS. 13A to 13D are diagrams illustrating that pixels and sensors are connected to a scan driving circuit, according to embodiments of the present disclosure.

Figure 13A:
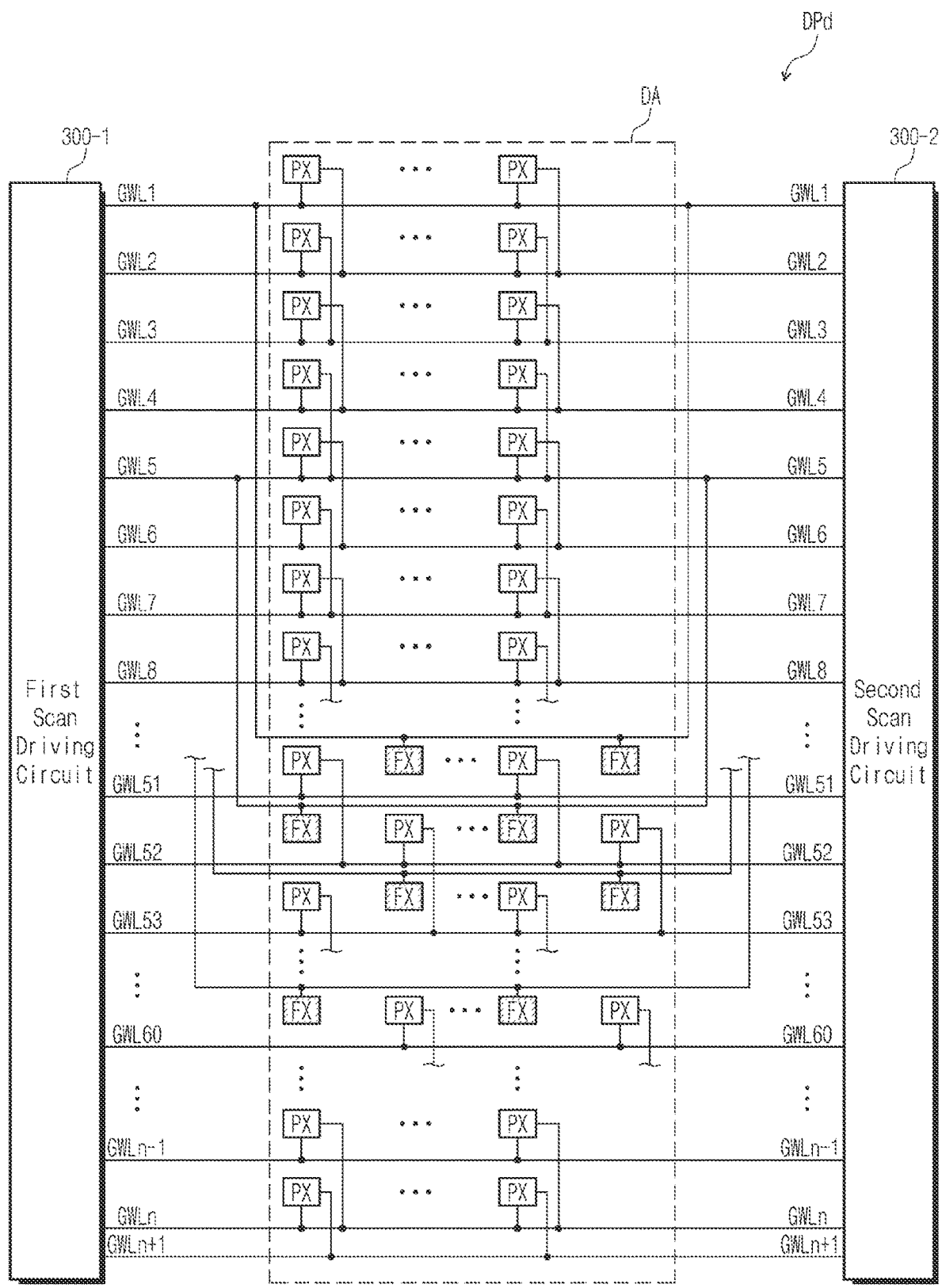
FIGS. 13A to 13D are diagrams illustrating that pixels and sensors are connected to a scan driving circuit, according to embodiments of the present disclosure.

FIG. 13A is a block diagram of the display panel DPd, according to an embodiment.

Referring to FIG. 13A, a first scan driving circuit 300-1 and a second scan driving circuit 300-2 may be arranged on a display panel DPd.

The first scan driving circuit 300-1 and the second scan driving circuit 300-2 may face each other with the display area DA interposed therebetween.

Each of the first scan driving circuit 300-1 and the second scan driving circuit 300-2 may be connected to the scan lines GWL1 to GWLn+1. That is, the pixels PX may be connected in common to the scan lines GWL1 to GWLn+1 extending from the first scan driving circuit 300-1 and the scan lines GWL1 to GWLn+1 extending from the second scan driving circuit 300-2.

The pixels PX in a j-th row among the pixels PX are connected to the j-th scan line GWLj. For example, the pixels PX in the first row are connected to the first scan line GWL1, the pixels PX in the 51st row are connected to the 51st scan line GWL51, and the pixels PX in the 52nd row are connected to the 52nd scan line GWL52.

Sensors in the j-th row among the sensors FX are connected to the a-th scan line GWLa. For example, when the detection time ts described in FIG. 9 is 4 horizontal periods (4H), the sensors FX in the 51st row may be connected to the first scan line GWL1, the sensors FX in the 52nd row may be connected to the fifth scan line GWL5, and the sensors FX in the 60th row may be connected to the 37th scan line GWL37.

To sufficiently secure the detection time ts described in FIG. 9, according to embodiments, the sensors FX in the j-th line is connected to the a-th scan line GWLa, and the sensors FX in the (j+1)-th line are connected to the b-th scan line GWLb. Here, 'a' is a positive integer different from 'j', and 'b' is a positive integer different from 'a' and 'j+1'. Furthermore, to sufficiently secure the detection time ts, 'b' may be greater than 'a' by 2 or more.

Figure 13B:
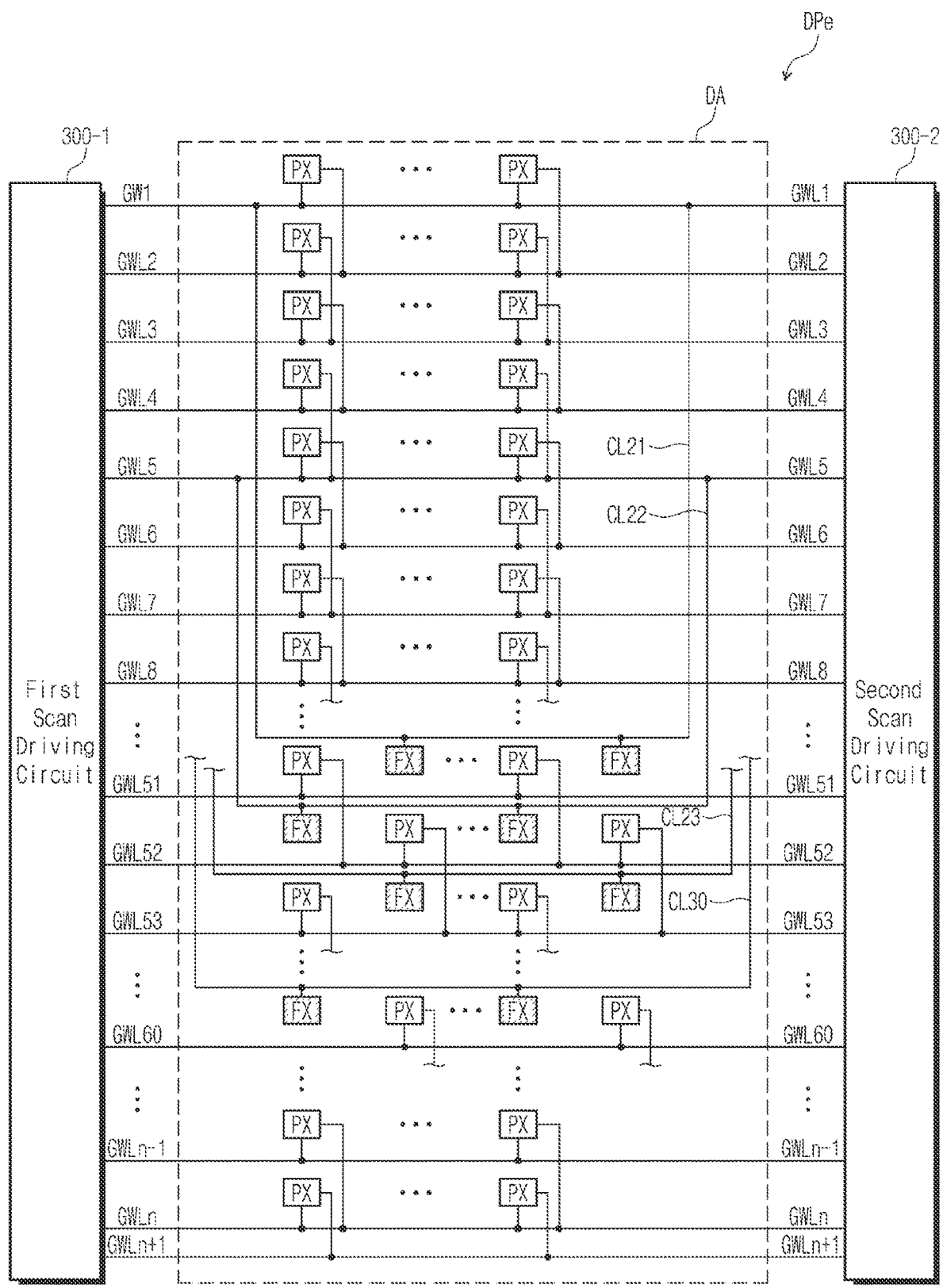

FIG. 13B is a block diagram of a display panel DPe, according to an embodiment.

Referring to FIG. 13B, the sensors FX in the j-th row among the sensors FX are connected to the a-th scan line GWLa. For example, the sensors FX in the 51st row are connected to the first scan line GWL1, the sensors FX in the 52nd row are connected to the fifth scan line GWL5, and the sensors FX in the 60th row are connected to the 37th scan line GWL37.

A connection wire CL21 connecting the first scan line GWL1 and the sensors FX in the 51st row, a connection wire CL22 connecting the fifth scan line GWL5 and the sensors FX in the 52nd row, a connection wire CL23 connecting the ninth scan line GWL9 and the sensors FX in the 53rd row, and a connection wire CL30 connecting the 37th scan line GWL37 and the sensors FX in the 60th row may be arranged in the display area DA. In an embodiment, as shown in FIG. 13A, the connection wires CL21 to CL30 may be arranged outside the display area DA, that is, in the non-display area NDA shown in FIG. 3.

Figure 13C:
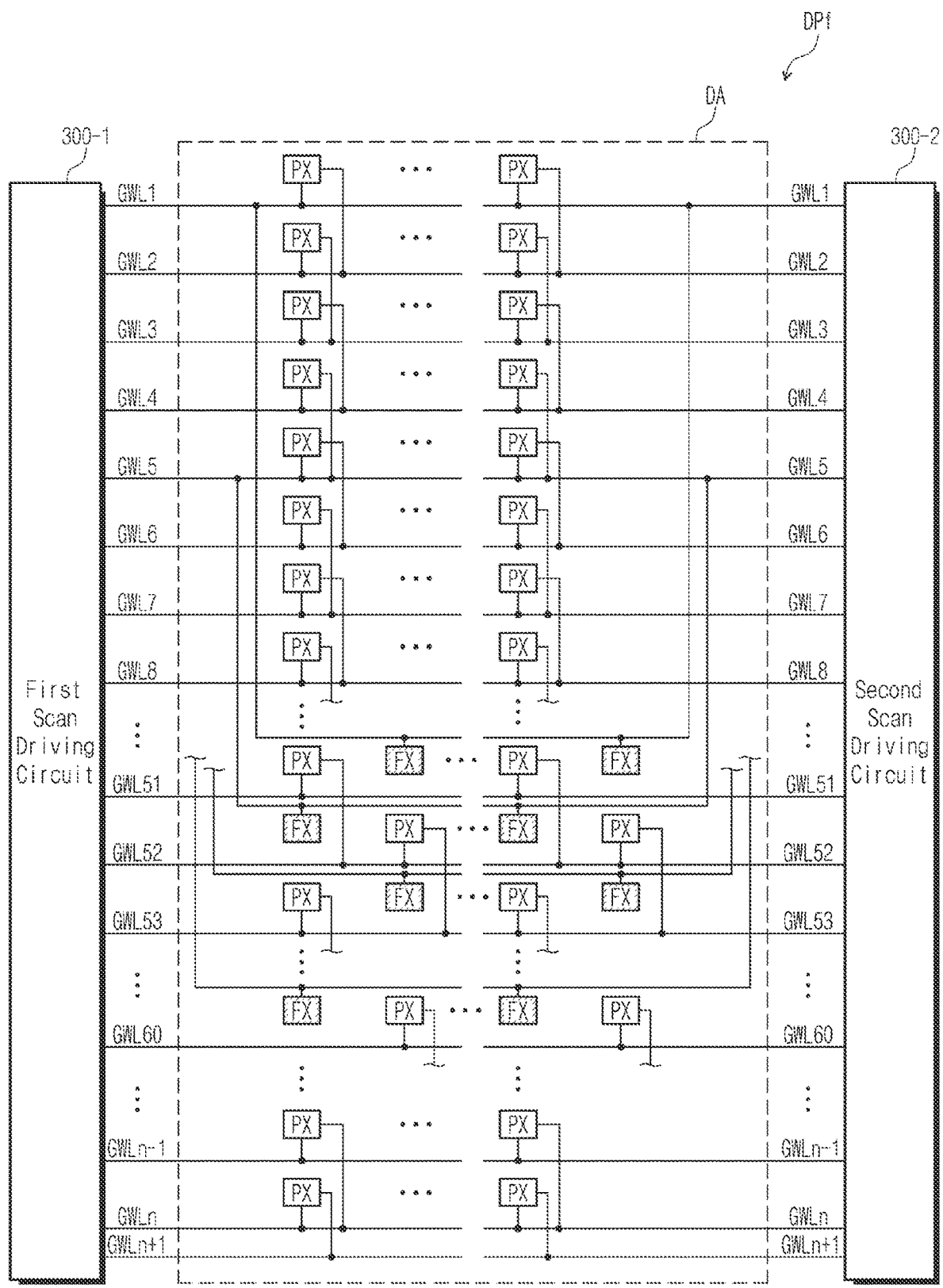

FIG. 13C is a block diagram of a display panel DPf, according to an embodiment.

Referring to FIG. 13C, the first scan driving circuit 300-1 and the second scan driving circuit 300-2 may be arranged on the display panel DPf.

The first scan driving circuit 300-1 and the second scan driving circuit 300-2 may face each other with the display area DA interposed therebetween.

Some of the pixels PX are connected to scan lines GWL1 to GWLn+1 extending from the first scan driving circuit 300-1. Some of the pixels PX are connected to scan lines GWL1 to GWLn+1 extending from the second scan driving circuit 300-2.

Some of the sensors FX are connected to corresponding scan lines among the scan lines GWL1 to GWLn+1 extending from the first scan driving circuit 300-1. Some of the sensors FX are connected to corresponding scan lines among the scan lines GWL1 to GWLn+1 extending from the second scan driving circuit 300-2.

Figure 13D:
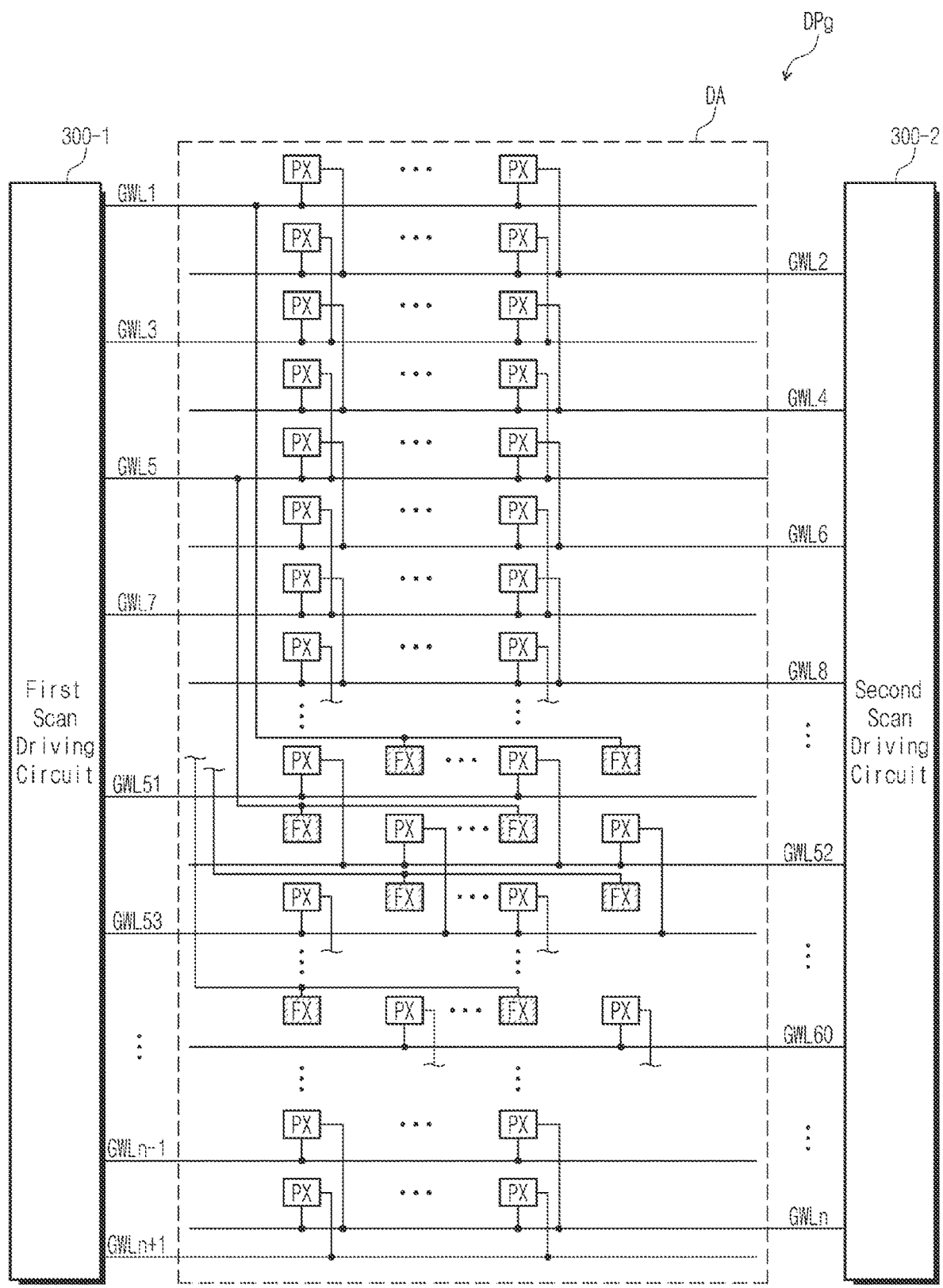

FIG. 13D is a block diagram of a display panel DPg, according to an embodiment.

Referring to FIG. 13D, the first scan driving circuit 300-1 and the second scan driving circuit 300-2 may be arranged on the display panel DPg.

The first scan driving circuit 300-1 and the second scan driving circuit 300-2 may face each other with the display area DA interposed therebetween.

The first scan driving circuit 300-1 may drive odd-numbered scan lines GWL1, GWL3, GWL5, . . . , GWLn−1, GWLn+1 among the scan lines GWL1 to GWLn+1. The second scan driving circuit 300-2 may drive even-numbered scan lines GWL2, GWL4, GWL6, . . . , GWLn among the scan lines GWL1 to GWLn+1.

The pixels PX arranged in the odd-numbered row among the pixels PX are connected to the odd-numbered scan lines GWL1, GWL3, GWL5, . . . , GWLn−1, GWLn+1 extending from the first scan driving circuit 300-1. The pixels PX arranged in the even-numbered row among the pixels PX are connected to the even-numbered scan lines GWL2, GWL4, GWL6, GWLn extending from the second scan driving circuit 300-2.

Sensors FX in the j-th row among the sensors FX are connected to the a-th scan line GWLa. For example, when the detection time ts described in FIG. 9 is 4 horizontal periods 4H, the sensors FX in the 51st row may be connected to the first scan line GWL1, the sensors FX in the 52nd row may be connected to the fifth scan line GWL5, and the sensors FX in the 60th row may be connected to the 37th scan line GWL37.

To sufficiently secure the detection time ts described in FIG. 9, according to embodiments, the sensors FX in the j-th line is connected to the a-th scan line GWLa, and the sensors FX in the (j+1)-th line are connected to the b-th scan line GWLb. Here, 'a' is a positive integer different from 'j', and 'b' is a positive integer different from 'a' and 'j+1'. Furthermore, to sufficiently secure the detection time ts, 'b' may be greater than 'a' by 2 or more.

Figure 14:
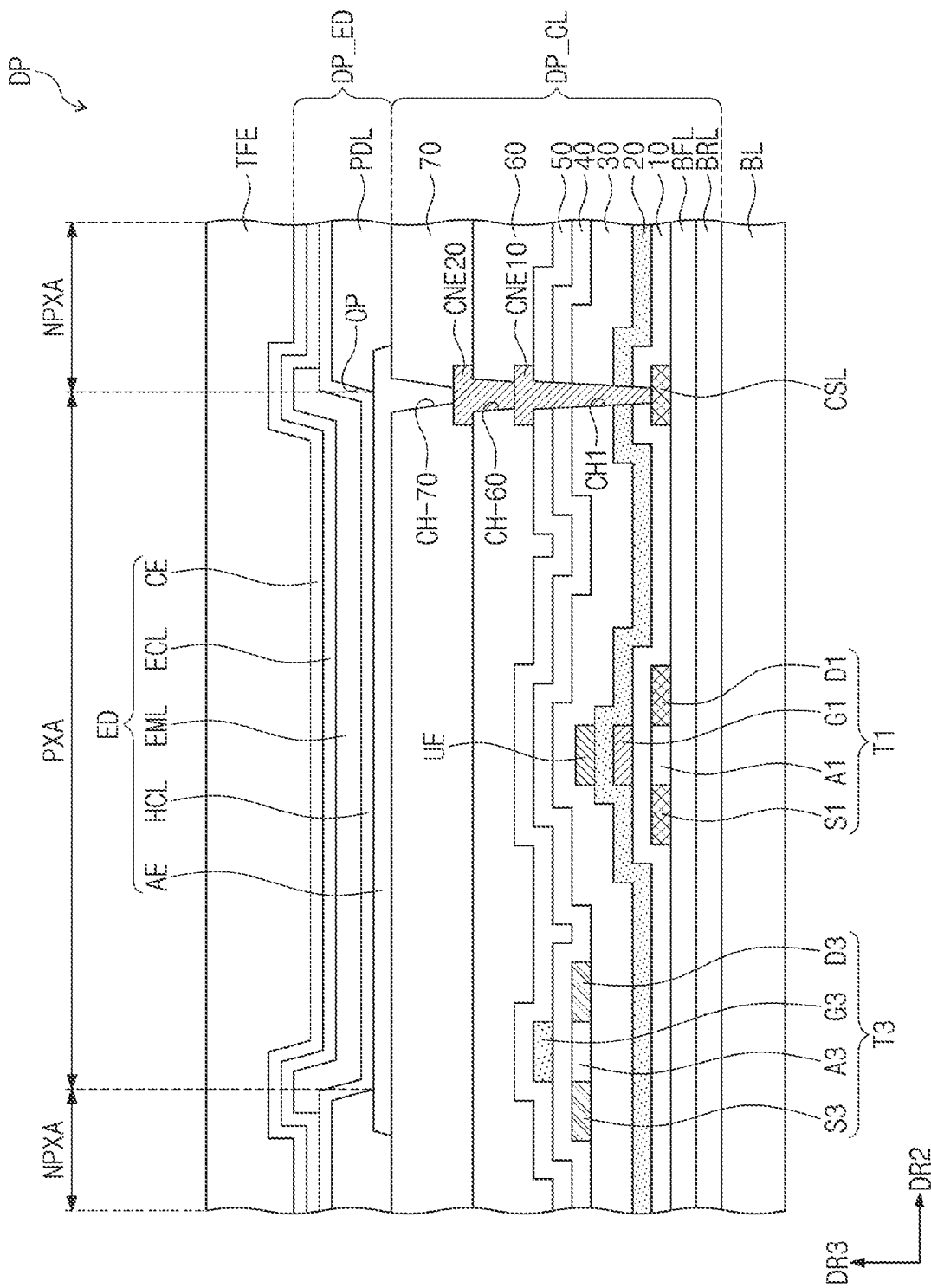
FIG. 14 is a cross-sectional view illustrating a pixel of a display panel, according to an embodiment of the present disclosure.
Figure 15B:
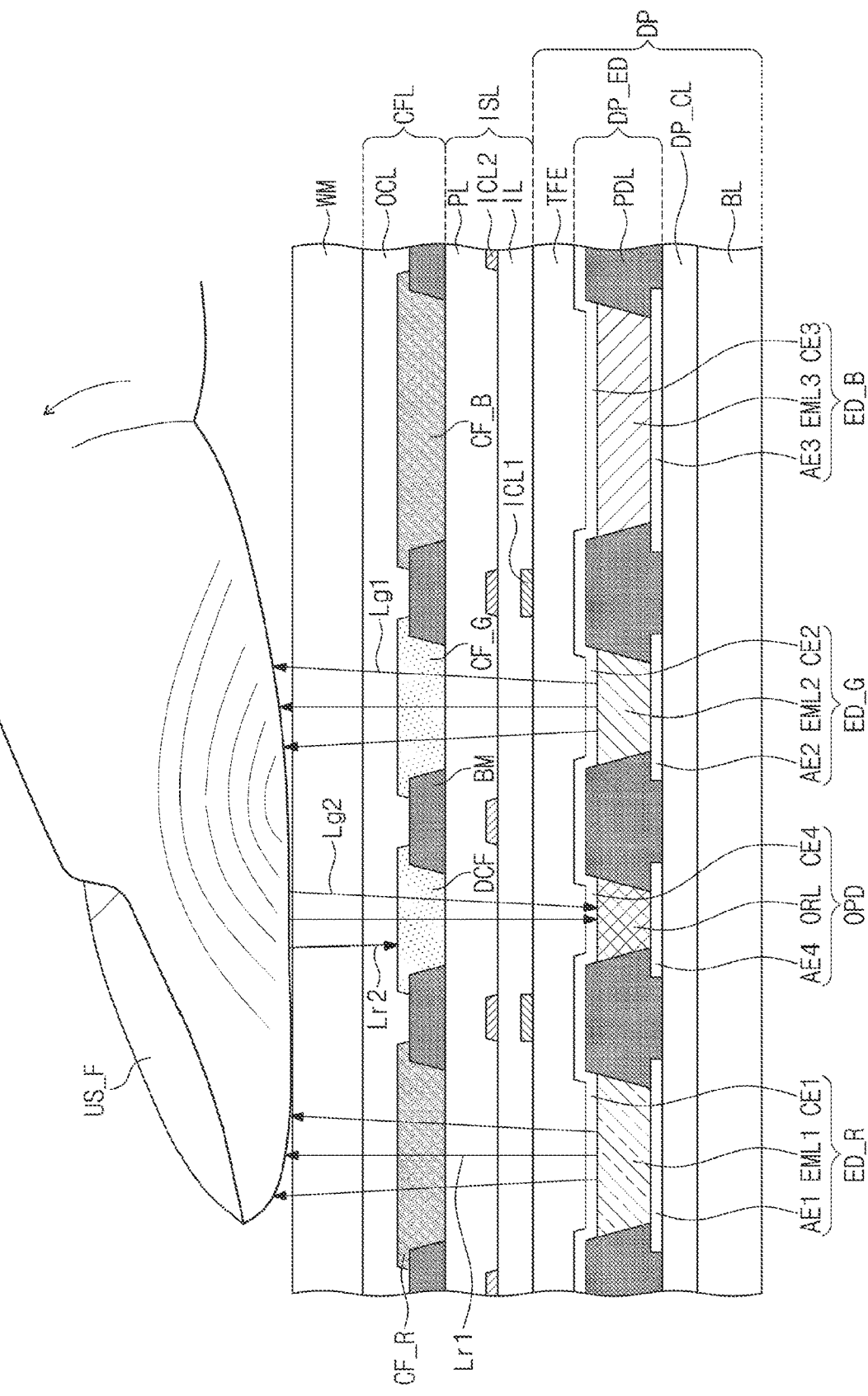

FIG. 14 is a cross-sectional view illustrating a pixel of a display panel, according to an embodiment of the present disclosure. FIGS. 15A and 15B are cross-sectional views illustrating a light emitting element and a light sensing element of a display panel, according to an embodiment of the present disclosure.

Referring to FIGS. 14 and 15A, the display panel DP may include the base layer BL, the circuit layer DP_CL disposed on the base layer BL, the element layer DP_ED, and the encapsulation layer TFE.

The base layer BL may include a synthetic resin layer. The synthetic resin layer may include a thermosetting resin. For example, the synthetic resin layer may be a polyimide-based resin layer. However, a material thereof is not particularly limited. The synthetic resin layer may include at least one of, for example, acrylate-based resin, methacrylate-based resin, polyisoprene-based resin, vinyl-based resin, epoxy-based resin, urethane-based resin, cellulose-based resin, siloxane-based resin, polyamide-based resin, and perylene-based resin. Further, the base layer BL may include, for example, a glass substrate, a metal substrate, an organic/inorganic composite substrate, etc.

At least one inorganic layer is formed on an upper surface of the base layer BL. The inorganic layer may include at least one of, for example, aluminum oxide, titanium oxide, silicon oxide, silicon oxynitride, zirconium oxide, and hafnium oxide. The inorganic layer may be formed in multiple layers. The multi-layered inorganic layers may constitute a barrier layer BRL and/or a buffer layer BFL, which will be described in further detail below. The barrier layer BRL and the buffer layer BFL may be disposed selectively.

The barrier layer BRL may prevent foreign objects from outside of the display device DD from entering the display device DD. The barrier layer BRL may include, for example, a silicon oxide layer and a silicon nitride layer. In an embodiment, the plurality of silicon oxide layers are present and the silicon nitride layers are present, and the silicon oxide layers and the silicon nitride layers may be alternately stacked.

The buffer layer BFL may be disposed on the barrier layer BRL. The buffer layer BFL may increase a bonding force between the base layer BL and the semiconductor pattern and/or the conductive pattern. The buffer layer BFL may include, for example, a silicon oxide layer and a silicon nitride layer. The silicon oxide layer and the silicon nitride layer may be alternately stacked.

The semiconductor pattern is disposed on the buffer layer BFL. Hereinafter, the semiconductor pattern directly disposed on the buffer layer BFL is defined as a first semiconductor pattern. The first semiconductor pattern may include a silicon semiconductor. The first semiconductor pattern may include polysilicon. However, embodiments of the present disclosure are not limited thereto, and the first semiconductor pattern may include, for example, amorphous silicon.

FIG. 14 only illustrates a part of the first semiconductor pattern. The first semiconductor pattern may be further disposed in another area of the pixel PXij (see FIG. 6). An electrical property of the first semiconductor pattern varies depending on whether the pattern is doped. The first semiconductor pattern may include a doped area and an undoped area. The doped area may be doped with an N-type dopant or a P-type dopant. A P-type transistor includes a doped area doped with the P-type dopant, and an N-type transistor includes a doped area doped with the N-type dopant.

The doped area has higher conductivity than the undoped area, and substantially operates as an electrode or signal line. The undoped area substantially corresponds to the active area (or channel) of a transistor. For example, a part of the first semiconductor pattern may be the active area of the transistor. Another part thereof may be a source or drain of the transistor. Another part thereof may be a connection signal line (or a connection electrode).

As illustrated in FIG. 14, a first electrode S1, a channel part A1, and a second electrode D1 of the first transistor T1 are formed from the first semiconductor pattern. The first electrode S1 and the second electrode D1 of the first transistor T1 extend in opposite directions from the channel part A1.

A portion of a connection signal line CSL formed from the semiconductor pattern is illustrated in FIG. 14. In an embodiment, the connection signal line CSL may be electrically connected to the second electrode of the sixth transistor T6 (see FIG. 6) in a plane.

A first insulating layer 10 is disposed on the buffer layer BFL. The first insulating layer 10 overlaps the plurality of pixels PX (see FIG. 3) in common so as to cover the first semiconductor pattern. The first insulating layer 10 may be an inorganic layer and/or an organic layer, and may have a single-layer structure or a multi-layer structure. The first insulating layer 10 may include at least one of, for example, an aluminum oxide, a titanium oxide, a silicon oxide, a silicon oxynitride, a zirconium oxide, and a hafnium oxide. In an embodiment, the first insulating layer 10 may be a silicon oxide layer having a single layer structure. An insulating layer of the circuit layer DP_CL, which is to be described in further detail below, as well as the first insulating layer 10, may be an inorganic layer and/or an organic layer, and may have a single-layer structure or a multi-layer structure. The inorganic layer may include at least one of the above-described materials.

A gate electrode G1 of the first transistor T1 is disposed on the first insulating layer 10. The gate electrode G1 may be a part of a metal pattern. The gate electrode G1 of the first transistor T1 overlaps the channel part A1 of the first transistor T1. In a process of doping the first semiconductor pattern, the gate electrode G1 of the first transistor T1 may serve as a mask.

A second insulating layer 20 covering the gate electrode G1 is disposed on the first insulating layer 10. The second insulating layer 20 overlaps the plurality of pixels PX in common. The second insulating layer 20 may be an inorganic layer and/or an organic layer, and may have a single layer structure or a multi-layer structure. In an embodiment, the second insulating layer 20 may be a silicon oxide layer having a single layer structure.

An upper electrode UE may be disposed on the second insulating layer 20. The upper electrode UE may overlap the gate electrode G1. The upper electrode UE may be a part of a metal pattern or a part of a doped semiconductor pattern. A portion of the gate electrode G1 and the upper electrode UE overlapping the portion of the gate electrode G1 may define the capacitor Cst (see FIG. 6). In an embodiment of the present disclosure, the upper electrode UE may be omitted.

In an embodiment of the present disclosure, the second insulating layer 20 may be replaced with an insulating pattern. The upper electrode UE is arranged on the insulating pattern. The upper electrode UE may serve as a mask for forming an insulating pattern from the second insulating layer 20.

A third insulating layer 30 covering the upper electrode UE is disposed on the second insulating layer 20. In an embodiment, the third insulating layer 30 may be a silicon oxide layer having a single layer structure. A semiconductor pattern is arranged on the third insulating layer 30. Hereinafter, the semiconductor pattern directly disposed on the third insulating layer 30 is referred to as a second semiconductor pattern. The second semiconductor pattern may include a metal oxide. The oxide semiconductor may include a crystalline or amorphous oxide semiconductor. For example, the oxide semiconductor may include metal such as, for example, zinc (Zn), indium (In), gallium (Ga), tin (Sn), titanium (Ti), etc., and a mixture of these oxides. The oxide semiconductors may include, for example, indium-tin oxide (ITO), indium-gallium-zinc oxide (IGZO), zinc oxide (ZnO), indium-zinc oxide (IZO), zinc-indium oxide (ZIO), indium oxide (InO), titanium oxide (TiO), indium-zinc-tin oxide (IZTO), zinc-tin oxide (ZTO), etc.

FIG. 14 only illustrates a part of the second semiconductor pattern. The second semiconductor pattern may be further disposed in another area of the pixel PXij (see FIG. 6). The second semiconductor pattern may include a plurality of areas identified depending on whether the metal oxide is reduced. An area in which the metal oxide is reduced (hereinafter, a reduction area) has higher conductivity than an area in which the metal oxide is not reduced (hereinafter, a non-reduction area). The reduction area substantially has the role of an electrode or signal line. The non-reduction area substantially corresponds to a channel part of a transistor. For example, a part of the second semiconductor pattern may be a channel part of a transistor, and another part may be a first electrode or a second electrode of the transistor.

As illustrated in FIG. 14, a first electrode S3, a channel part A3, and a second electrode D3 of the third transistor T3 are formed from the second semiconductor pattern. The first electrode S3 and the second electrode D3 include a metal reduced from a metal oxide semiconductor. The first electrode S3 and the second electrode D3 may have a predetermined thickness from an upper surface of the second semiconductor pattern, and may include a metal layer including the reduced metal.

A fourth insulating layer 40 covering the second semiconductor pattern is disposed on the third insulating layer 30. In an embodiment, the fourth insulating layer 40 may be a silicon oxide layer having a single layer structure. A gate electrode G3 of the third transistor T3 is disposed on the fourth insulating layer 40. The gate electrode G3 may be a part of a metal pattern. The gate electrode G3 of the third transistor T3 overlaps the channel part A3 of the third transistor T3.

In an embodiment of the present disclosure, the fourth insulating layer 40 may be replaced with an insulating pattern. The gate electrode G3 of the third transistor T3 is disposed on the insulating pattern. In an embodiment, the gate electrode G3 may have the same shape as the insulating pattern in a plane. Although, for convenience of description, only one gate electrode G3 is illustrated, embodiments are not limited thereto. For example, according to embodiments, the third transistor T3 may include two gate electrodes.

A fifth insulating layer 50 covering the gate electrode G3 is disposed on the fourth insulating layer 40. In an embodiment, the fifth insulating layer 50 may include a silicon oxide layer and a silicon nitride layer. The fifth insulating layer 50 may include a plurality of silicon oxide layers and a plurality of silicon nitride layers, which are alternately stacked.

In an embodiment, the first electrode and the second electrode of the fourth transistor T4 (see FIG. 6) may be formed through the same process as the first electrode S3 and the second electrode D3 of the third transistor T3. Moreover, the first and second electrodes of the reset transistor ST1 of the sensor FXij shown in FIG. 6 may be formed through the same process as the first electrode S3 and the second electrode D3 of the third transistor T3.

At least one insulating layer is further disposed on the fifth insulating layer 50. In an embodiment, a sixth insulating layer 60 and a seventh insulating layer 70 may be disposed on the fifth insulating layer 50. The sixth insulating layer 60 and the seventh insulating layer 70 may be organic layers, and may have a single-layer or multi-layer structure. The sixth insulating layer 60 and the seventh insulating layer 70 may be a polyimide-based resin layer having a single layer structure. However, embodiments of the present disclosure are not limited thereto. For example, the sixth insulating layer 60 and the seventh insulating layer 70 may include at least one of acrylate-based resin, methacrylate-based resin, polyisoprene-based resin, vinyl-based resin, epoxy-based resin, urethane-based resin, cellulose-based resin, siloxane-based resin, polyamide-based resin, and perylene-based resin.

A first connection electrode CNE10 may be disposed on the fifth insulating layer 50. The first connection electrode CNE10 may be connected to the connection signal line CSL through a first contact hole CH1 penetrating the first to fifth insulating layers 10 to A second connection electrode CNE20 may be connected to the first connection electrode CNE10 through a contact hole CH-60 penetrating the sixth insulating layer 60. In an embodiment of the present disclosure, at least one of the fifth insulating layer 50 and the sixth insulating layer 60 may be omitted.

The element layer DP_ED includes the light emitting element ED and a pixel defining layer PDL. An anode AE of the light emitting element ED is disposed on the seventh insulating layer 70. The anode AE of the light emitting element ED may be connected to the second connection electrode CNE20 through a contact hole CH-70 penetrating the seventh insulating layer 70.

An opening OP of the pixel defining layer PDL exposes at least part of the anode AE of the light emitting element ED. The opening OP of the pixel defining layer PDL may define an emission area PXA. For example, the plurality of pixels PX (see FIG. 3) may be arranged in a plane of the display panel DP (see FIG. 3) depending on a specific rule. An area in which the plurality of pixels PX are arranged may be defined as a pixel area. One pixel area may include the emission area PXA and a non-emission area NPXA adjacent to the emission area PXA. The non-emission area NPXA may surround the emission area PXA.

A hole control layer HCL may be disposed in common in the emission area PXA and the non-emission area NPXA. A common layer such as the hole control layer HCL may be formed in common in the plurality of pixels PX. The hole control layer HCL may include a hole transport layer and a hole injection layer.

A light emitting layer EML is disposed on the hole control layer HCL. The light emitting layer EML may be disposed in only an area corresponding to the opening OP. The light emitting layer EML may be separately formed in each of the plurality of pixels PX.

In an embodiment, the patterned light emitting layer EML is illustrated. However, the light emitting layer EML may be disposed in the plurality of pixels PX in common. The light emitting layer EML may generate white light or blue light. The light emitting layer EML may have a multi-layer structure.

An electron control layer ECL is disposed on the light emitting layer EML. The electron control layer ECL may include an electron transport layer and an electron injection layer. A cathode CE of the light emitting element ED is disposed on the electron control layer ECL. The electron control layer ECL and the cathode CE are disposed in common in the plurality of pixels PX.

The encapsulation layer TFE is disposed on the cathode CE. The encapsulation layer TFE may cover the plurality of pixels PX. In an embodiment, the encapsulation layer TFE directly covers the cathode CE. In an embodiment of the present disclosure, the display panel DP may further include a capping layer directly covering the cathode CE. In an embodiment of the present disclosure, the stacked structure of the light emitting element ED may have a vertically inverted structure in the structure shown in FIG. 12.

Referring to FIGS. 15A and 15B, a first electrode layer is disposed on the circuit layer DP_CL. The pixel defining layer PDL is formed on the first electrode layer. The first electrode layer may include first to third anodes AE1, AE2, AE3. First to third openings OP1, OP2, OP3 of the pixel defining layer PDL expose at least part of the first to third anodes AE1, AE2, AE3, respectively. In an embodiment of the present disclosure, the pixel defining layer PDL may further include a black material. The pixel defining layer PDL may further include a black organic dye/pigment such as, for example, carbon black, aniline black, etc. The pixel defining layer PDL may be formed by mixing a blue organic material and a black organic material. The pixel defining layer PDL may further include a liquid-repellent organic material.

As shown in FIG. 15A, the display panel DP may include first to third emission areas PXA-R, PXA-G, PXA-B and first to third non-emission areas NPXA-R, NPXA-G, NPXA-B that are adjacent to the first to third emission areas PXA-R, PXA-G, PXA-B. The non-emission area NPXA-R, NPXA-G, NPXA-B may surround the corresponding emission area PXA-R, PXA-G, PXA-B, respectively. In an embodiment, the first emission area PXA-R is defined to correspond to a partial area of the first anode AE1 exposed by the first opening OP1, the second emission area PXA-G is defined to correspond to a partial area of the second anode AE2 exposed by the second opening OP2, and the third emission area PXA-B is defined to correspond to a partial area of the third anode AE3 exposed by the third opening OP3. A non-pixel area NPA may be defined between the first to third non-emission areas NPXA-R, NPXA-G, NPXA-B.

A light emitting layer may be disposed on a first electrode layer. The light emitting layer may include first to third light emitting layers EML1 to EML3. The first to third light emitting layers EML1 to EML3 may be disposed in areas corresponding to the first to third openings OP1, OP2, OP3, respectively. The first to third light emitting layers EML1 to EML3 may be separately formed in first to third pixels PXR, PXG, and PXB (see FIGS. 5A to 5C). Each of the first to third light emitting layers EML1 to EML3 may include an organic material and/or an inorganic material. The first to third light emitting layers EML1 to EML3 may generate light of a predetermined color. For example, the first light emitting layer EML1 may generate red light, the second light emitting layer EML2 may generate green light, and the third light emitting layer EML3 may generate blue light.

In an embodiment, the patterned first to third light emitting layers EML1 to EML3 are illustrated. However, embodiments are not limited thereto. For example, in an embodiment, one light emitting layer may be disposed in the first to third emission areas PXA-R, PXA-G, and PXA-B in common. The light emitting layer may generate white light or blue light. The light emitting layer may have a multi-layered structure that is referred to as "tandem".

Each of the first to third light emitting layers EML1 to EML3 may include a low molecular weight organic material or a high molecular weight organic material as a light emitting material. Alternatively, each of the first to third light emitting layers EML1 to EML3 may include a quantum dot material as a light emitting material. The core of a quantum dot may be selected from, for example, a group II-VI compound, a group III-V compound, a group IV-VI compound, a group IV compound, a group IV compound, and a combination thereof.

A second electrode layer is disposed on the light emitting layer. The second electrode layer may include first to third cathodes CE1, CE2, and CE3. The first to third cathodes CE1, CE2, and CE3 may be electrically connected to one another. In an embodiment of the present disclosure, the first to third cathodes CE1, CE2, and CE3 may be integrated with each other. In this case, the first to third cathodes CE1, CE2, CE3 may be disposed in the first to third emission areas PXA-R, PXA-G, PXA-B, the first to third non-emission areas NPXA-R, NPXA-G, NPXA-B, and the non-pixel area NPA in common.

The element layer DP_ED may further include the sensors OPD. Each of the sensors OPD may be a photodiode. The pixel defining layer PDL may further include a fourth opening OP4 provided to correspond to the sensors OPD.

Each of the sensors OPD may include a fourth anode AE4, a photoelectric conversion layer ORL, and a fourth cathode CE4. The fourth anode AE4 may be disposed on the same layer as the first electrode layer. That is, the fourth anode AE4 may be disposed on the element layer DP_CL, and may be simultaneously formed through the same process as the first to third anodes AE1 to AE3.

The fourth opening OP4 of the pixel defining layer PDL exposes at least part of the fourth anode AE4. The photoelectric conversion layer ORL is disposed on the fourth anode AE4 exposed by the fourth opening OP4. The photoelectric conversion layer ORL may include an organic photo-sensing material. The fourth cathode CE4 may be disposed on the photoelectric conversion layer ORL. The fourth cathode CE4 may be simultaneously formed through the same process as the first to third cathodes CE1 to CE3. In an embodiment of the present disclosure, the fourth cathode CE4 may be integrated with the first to third cathodes CE1 to CE3.

Each of the fourth anode AE4 and the fourth cathode CE4 may receive an electrical signal. The fourth cathode CE4 may receive a signal different from that of the fourth anode AE4. Accordingly, a predetermined electric field may be formed between the fourth anode AE4 and the fourth cathode CE4. The photoelectric conversion layer ORL generates an electrical signal corresponding to the light incident on a sensor. The photoelectric conversion layer ORL may generate an electric charge by absorbing the energy of the incident light. For example, the photoelectric conversion layer ORL may include a light-sensitive semiconductor material.

The electric charge generated in the photoelectric conversion layer ORL changes the electric field between the fourth anode AE4 and the fourth cathode CE4. The amount of charge generated in the photoelectric conversion layer ORL may vary depending on whether light is incident on the sensors OPD, or the amount and intensity of light incident on the sensors OPD. Accordingly, the electric field formed between the fourth anode AE4 and the fourth cathode CE4 may vary. The sensors OPD according to an embodiment of the present disclosure may obtain fingerprint information of a user through a change in the electric field between the fourth anode AE4 and the fourth cathode CE4.

However, embodiments of the present disclosure are not limited thereto. For example, according to embodiments, each of the sensors OPD may include a phototransistor that uses the photoelectric conversion layer ORL as an active layer. In this case, each of the sensors OPD may obtain fingerprint information by sensing the amount of current flowing through the phototransistor. Each of the sensors OPD according to an embodiment of the present disclosure may include various photoelectric conversion elements capable of generating an electrical signal in response to a change in the amount of light. However, the sensors OPD are not limited thereto.

The encapsulation layer TFE is disposed on the element layer DP_ED. The encapsulation layer TFE includes at least one inorganic layer or at least one organic layer. In an embodiment of the present disclosure, the encapsulation layer TFE may include two inorganic layers and an organic layer disposed therebetween. In an embodiment of the present disclosure, a thin-film encapsulation layer may include a plurality of inorganic layers and a plurality of organic layers, which are alternately stacked.

An encapsulation inorganic layer may protect the light emitting element ED from, for example, moisture or oxygen. An encapsulation organic layer may protect the light emitting element ED from foreign objects such as, for example, dust particles. The encapsulation inorganic layer may include, for example, a silicon nitride layer, a silicon oxynitride layer, a silicon oxide layer, a titanium oxide layer, an aluminum oxide layer, etc., but is not limited thereto. The encapsulation organic layer may include an acryl-based organic layer, but is not limited thereto.

The display device DD includes the input sensing layer ISL disposed on the display panel DP and the color filter layer CFL disposed on the input sensing layer ISL.

The input sensing layer ISL may be disposed directly on the encapsulation layer TFE. The input sensing layer ISL includes a first conductive layer ICL1, an insulating layer IL, a second conductive layer ICL2, and a protective layer PL. The first conductive layer ICL1 may be disposed on the encapsulation layer TFE. FIGS. 15A and 15B illustrate a structure in which the first conductive layer ICL1 is directly disposed on the encapsulation layer TFE, but the present disclosure is not limited thereto. The input sensing layer ISL may further include a base insulating layer interposed between the first conductive layer ICL1 and the encapsulation layer TFE. In this case, the encapsulation layer TFE may be covered by the base insulating layer, and the first conductive layer ICL1 may be disposed on the base insulating layer. In an embodiment of the present disclosure, the base insulating layer may include an inorganic insulating material.

The insulating layer IL may cover the first conductive layer ICL1. The second conductive layer ICL2 is disposed on the insulating layer IL. Although a structure in which the input sensing layer ISL includes the first and second conductive layers ICL1 and ICL2 is illustrated, the present disclosure is not limited thereto. For example, according to embodiments, the input sensing layer ISL may include only one of the first and second conductive layers ICL1 and ICL2.

The protective layer PL may be disposed on the second conductive layer ICL2. The protective layer PL may include an organic insulating material. The protective layer PL may protect the first and second conductive layers ICL1 and ICL2 from moisture/oxygen, and may protect the first and second conductive layers ICL1 and ICL2 from foreign objects.

The color filter layer CFL may be disposed on the input sensing layer ISL. The color filter layer CFL may be disposed directly on the protective layer PL. The color filter layer CFL may include a first color filter CF_R, a second color filter CF_G, and a third color filter CF_B. The first color filter CF_R has a first color, the second color filter CF_G has a second color, and the third color filter CF_B has a third color. In an embodiment of the present disclosure, the first color may be red, the second color may be green, and the third color may be blue.

The color filter layer CFL may further include a dummy color filter DCF. In an embodiment of the present disclosure, when an area where the photoelectric conversion layer ORL is disposed is defined as a sensing area SA, and a periphery of the sensing area SA is defined as a non-sensing area NSA, the dummy color filter DCF may be disposed to correspond to the sensing area SA. The dummy color filter DCF may overlap the sensing area SA and the non-sensing area NSA. In an embodiment of the present disclosure, the dummy color filter DCF may have the same color as one of the first to third color filters CF_R, CF_G, and CF_B. In an embodiment of the present disclosure, the dummy color filter DCF may have the same green color as the second color filter CF_G.

The color filter layer CFL may further include a black matrix BM. The black matrix BM may be disposed to correspond to the non-pixel area NPA. The black matrix BM may be disposed to overlap the first and second conductive layers ICL1 and ICL2 in the non-pixel area NPA. In an embodiment of the present disclosure, the black matrix BM may overlap the non-pixel area NPA and the first to third non-emission areas NPXA-R, NPXA-G, NPXA-B. The black matrix BM may not overlap the first to third emission areas PXA-R, PXR-G, PXA-B.

The color filter layer CFL may further include an overcoat layer OCL. The overcoat layer OCL may include an organic insulating material. The overcoat layer OCL may be provided with a thickness sufficient to remove a level difference between the first to third color filters CF_R, CF_G, CF_B. As long as a material is capable of having a predetermined thickness and planarizing an upper surface of the color filter layer CFL, the overcoat layer OCL may include the material without being particularly limited. For example, the overcoat layer OCL may include an acrylate-based organic material.

Referring to FIG. 15B, when the display device DD (see FIG. 1) operates, each of first to third light emitting elements ED_R, ED_G, and ED_B may output or emit light. The first light emitting elements ED_R emit first light Lr1, the second light emitting elements ED_G emit second light Lg1, and the third light emitting elements ED_B output third light. Herein, the first light Lr1 may be light in a red wavelength band, the second light Lg1 may be light in a green wavelength band, and the third light may be light in a blue wavelength band.

In an embodiment of the present disclosure, each of the sensors OPD may receive light from specific light emitting elements (e.g., second light emitting elements ED_G) among first to third light emitting elements ED_R, ED_G, and ED_B. That is, each of the sensors OPD may receive a second reflected light Lg2, which is reflected by a user's fingerprint from the second light Lg1 output from the second light emitting elements ED_G. The second light Lg1 and the second reflected light Lg2 may be light in a green wavelength band. The dummy color filter DCF is disposed over the sensors OPD. The dummy color filter DCF may have a green color. Accordingly, the second reflected light Lg2 may pass through the dummy color filter DCF and may be incident on the sensors OPD.

Meanwhile, first and third lights output from the first and third light emitting elements ED_R and ED_B may also be reflected by the user's hand US_F. For example, when light from reflecting the first light Lr1, which is output from the first light emitting elements ED_R, from the user's hand US_F is defined as first reflected light Lr2, the first reflected light Lr2 may be absorbed without passing through the dummy color filter DCF. Accordingly, the first reflected light Lr2 may not pass through the dummy color filter DCF, and thus may not be incident on the sensors OPD. Likewise, even though the third light is reflected by the user's hand US_F, the third light may be absorbed by the dummy color filter DCF. Accordingly, only the second reflected light Lg2 may be provided to the sensors OPD.

A display device having a configuration according to embodiments of the present disclosure may detect biometric information of a user by including a sensor formed through the same process as a pixel. According to embodiments, since the sensor is driven using a scan signal for driving the pixel, a separate signal wire that drives the sensor may be omitted. According to embodiments, the reliability of the detected biometric information may be increased by securing a sufficient amount of time to detect a signal received from the sensor.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device, comprising:
 a display panel including a plurality of pixels and a plurality of sensors; and
 a scan driving circuit configured to drive a plurality of scan lines including a j-th scan line and an a-th scan line,
 wherein the j-th scan line and the a-th scan line are connected to the scan driving circuit,
 wherein the scan driving circuit provides a j-th scan signal to pixels in a j-th row among the plurality of pixels through the j-th scan line among the plurality of scan lines,
 wherein the scan driving circuit provides an a-th scan signal to sensors, which correspond to the pixels in the j-th row, from among the plurality of sensors through the a-th scan line among the plurality of scan lines,
 wherein the scan driving circuit provides the a-th scan signal to pixels in an a-th row through the a-th scan line among the plurality of scan lines, and
 wherein j is a positive integer, and a is a positive integer different from j.

2. The display device of claim 1, wherein sensors, which correspond to pixels in a (j+1)-th row, from among the plurality of sensors are connected to a b-th scan line among the plurality of scan lines, and
 wherein b is a positive integer different from a and different from j+1.

3. The display device of claim 2, wherein a value of b is greater than a value of a.

4. The display device of claim 1, wherein a first display area and a second display area are defined in the display panel,
 wherein the plurality of pixels are arranged in the first display area and the second display area, and
 wherein the plurality of sensors are arranged in the second display area.

5. The display device of claim 1, wherein each of the plurality of sensors comprises:
 a light sensing element; and
 a sensor driving circuit connected to the light sensing element and a corresponding scan line among the plurality of scan lines, and configured to output a detection signal corresponding to external light in response to a scan signal received through the corresponding scan line.

6. The display device of claim 5, wherein the sensor driving circuit comprises:
 a reset transistor including a first electrode that receives a reset voltage, a second electrode connected to a first sensing node, and a gate electrode that receives a reset signal;
 an amplification transistor including a first electrode that receives a driving voltage, a second electrode connected to a second sensing node, and a gate electrode connected to the first sensing node; and
 an output transistor including a first electrode connected to the second sensing node, a second electrode connected to a readout line, and a gate electrode that receives the scan signal.

7. The display device of claim 6, wherein a type of the reset transistor is different from each of a type of the amplification transistor and a type of the output transistor.

8. The display device of claim 7, wherein the reset transistor is an N-type transistor, and
 wherein each of the amplification transistor and the output transistor is a P-type transistor.

9. The display device of claim 6, further comprising:
 a readout circuit connected to the readout line and configured to receive the detection signal through the readout line in response to at least one switching signal.

10. The display device of claim 5, wherein each of the plurality of pixels comprises:
 a light emitting element; and
 a pixel driving circuit connected to the light emitting element and a corresponding scan line among the plurality of scan lines, and configured to drive the light emitting element in response to a scan signal received through the corresponding scan line.

11. The display device of claim 10, wherein the pixel driving circuit comprises:
 a first transistor connected between a first driving voltage line that receives a first driving voltage and the light emitting element;
 a second transistor connected between a data line and a first electrode of the first transistor and including a gate electrode connected to the corresponding scan line among the plurality of scan lines; and a third transistor connected between a second electrode of the first transistor and a gate electrode of the first transistor and including a gate electrode that receives a first scan signal.

12. The display device of claim 11, wherein each of the first transistor and the second transistor is a P-type transistor, and the third transistor is an N-type transistor.

13. The display device of claim 11, wherein the pixel driving circuit further comprises:
a fourth transistor connected between the gate electrode of the first transistor and a second driving voltage line and including a gate electrode that receives a second scan signal;
a fifth transistor connected between the first driving voltage line and the first electrode of the first transistor and including a gate electrode that receives an emission control signal;
a sixth transistor connected between the second electrode of the first transistor and the light emitting element and including a gate electrode that receives the emission control signal; and
a seventh transistor connected between the light emitting element and a third driving voltage line and including a gate electrode connected to the corresponding scan line among the plurality of scan lines.

14. The display device of claim 10, wherein the display panel comprises:
a base layer;
a circuit layer disposed on the base layer, wherein the pixel driving circuit and the sensor driving circuit are disposed in the circuit layer; and
an element layer disposed on the circuit layer, wherein the light emitting element and the light sensing element are disposed in the element layer.

15. The display device of claim 14, wherein the light emitting element is an organic light emitting diode, and
wherein the light sensing element is an organic photodiode.

16. A display device, comprising:
a plurality of pixels, each of which includes a light emitting element and a pixel driving circuit connected to the light emitting element and configured to drive the light emitting element;
a scan driving circuit configured to drive a plurality of scan lines including a j-th scan line and an a-th scan line,
wherein the j-th scan line and the a-th scan line are connected to the scan driving circuit; and
a plurality of sensors, each of which includes a light sensing element and a sensor driving circuit connected to the light sensing element and configured to output a detection signal corresponding to external light,
wherein pixels in a j-th row among the plurality of pixels are connected to the j-th scan line among the plurality of scan lines,
wherein pixels in an a-th row among the plurality of pixels are connected to the a-th scan line among the plurality of scan lines,
wherein j is a positive integer,
wherein the sensor driving circuit of a sensor, which corresponds to the pixels in the j-th row, from among the plurality of sensors comprises:
a reset transistor including a first electrode that receives a reset voltage, a second electrode connected to a first sensing node, and a gate electrode that receives a reset signal;
an amplification transistor including a first electrode that receives a driving voltage, a second electrode connected to a second sensing node, and a gate electrode connected to the first sensing node; and
an output transistor including a first electrode connected to the second sensing node, a second electrode connected to a readout line, and a gate electrode connected to the a-th scan line among the plurality of scan lines,
wherein a is a positive integer different from j,
wherein the scan driving circuit provides a j-th scan signal to the pixels in the j-th row among the plurality of pixels through the j-th scan line among the plurality of scan lines, provides an a-th scan signal to sensors, which correspond to the pixels in the j-th row, from among the plurality of sensors through the a-th scan line among the plurality of scan lines, and provides the a-th scan signal to the pixels in the a-th row among the plurality of pixels through the a-th scan line among the plurality of scan lines.

17. The display device of claim 16,
wherein the plurality of pixels are arranged in a first display area and a second display area, and
wherein the plurality of sensors are arranged in the second display area.

18. The display device of claim 16, further comprising:
a readout circuit connected to the readout line and configured to receive the detection signal through the readout line in response to at least one switching signal.

19. The display device of claim 16, wherein the pixel driving circuit comprises:
a first transistor connected between a first driving voltage line that receives a first driving voltage and the light emitting element;
a second transistor connected between a data line and a first electrode of the first transistor and including a gate electrode connected to a corresponding scan line among the plurality of scan lines; and
a third transistor connected between a second electrode of the first transistor and a gate electrode of the first transistor and including a gate electrode that receives a first scan signal.

20. The display device of claim 19, wherein each of the amplification transistor, the output transistor, the first transistor, and the second transistor is a P-type transistor, and
wherein each of the reset transistor and the third transistor is an N-type transistor.

* * * * *